US008818175B2

(12) United States Patent
Dubin et al.

(10) Patent No.: US 8,818,175 B2
(45) Date of Patent: Aug. 26, 2014

(54) GENERATION OF COMPOSITED VIDEO PROGRAMMING

(71) Applicant: Vumanity Media, Inc., Santa Monica, CA (US)

(72) Inventors: Jay Dubin, Santa Monica, CA (US); Mel Raab, Beverly Hills, CA (US); Adam J. Hubert, Santa Monica, CA (US); Adam Leonard, San Francisco, CA (US); Jeff Geoffray, Santa Monica, CA (US)

(73) Assignee: Vumanity Media, Inc., Santa Monica, CA (US)

( * ) Notice: Subject to any disclaimer, the term of this patent is extended or adjusted under 35 U.S.C. 154(b) by 19 days.

(21) Appl. No.: 13/841,779

(22) Filed: Mar. 15, 2013

(65) Prior Publication Data

US 2013/0216206 A1 Aug. 22, 2013

Related U.S. Application Data

(63) Continuation-in-part of application No. 13/043,446, filed on Mar. 8, 2011, now Pat. No. 8,406,608.

(60) Provisional application No. 61/311,552, filed on Mar. 8, 2010.

(51) Int. Cl.
*H04N 9/87* (2006.01)
*H04N 7/15* (2006.01)
*G11B 27/031* (2006.01)

(52) U.S. Cl.
CPC .................. *H04N 9/87* (2013.01); *H04N 7/155* (2013.01); *G11B 27/031* (2013.01)
USPC ........................................................ 386/282

(58) Field of Classification Search
None
See application file for complete search history.

(56) References Cited

U.S. PATENT DOCUMENTS 5,835,129 A 11/1998 Kumar
6,121,963 A * 9/2000 Ange ............................ 715/202
(Continued)

FOREIGN PATENT DOCUMENTS

WO WO 2008-027724 3/2008

OTHER PUBLICATIONS

Prosecution history of parent U.S. Appl. No. 13/043,446 (now US Patent 8,406,608).
(Continued)

*Primary Examiner* — Hung Dang
*Assistant Examiner* — Sunghyoun Park
(74) *Attorney, Agent, or Firm* — Joseph G. Swan, P.C.

(57) ABSTRACT

A system for creating video programming is provided. The system includes: a processor-based production server that has access to a library of existing styles for wrapping around video, each of such styles including a specific arrangement of design elements; a processor-based contributor device configured to accept input of video content and electronically transfer such video content to the production server via a network; and a processor-based administrator device, providing a user interface that permits a user to: (i) design new styles and modify the existing styles, (ii) specify rules as to when particular styles are to apply, and (iii) electronically communicate the new and modified styles and the rules to the production server. The production server applies the specified rules in relation to user-specific information in order to select a style and applies the selected style to generate a completed show.

27 Claims, 10 Drawing Sheets

(56) References Cited

U.S. PATENT DOCUMENTS

| | | | |
|---|---|---|---|
| 6,970,639 | B1 | 11/2005 | McGrath et al. |
| 7,359,617 | B2 | 4/2008 | Ma |
| 7,362,946 | B1 | 4/2008 | Kowald |
| 7,428,000 | B2 | 9/2008 | Cutler et al. |
| 7,653,705 | B2 | 1/2010 | Gudipaty et al. |
| 7,822,050 | B2 | 10/2010 | DeGrazia |
| 8,347,213 | B2 | 1/2013 | Clifton et al. |
| 2002/0052976 | A1* | 5/2002 | Loesch et al. ............ 709/313 |
| 2002/0059342 | A1 | 5/2002 | Gupta et al. |
| 2004/0148642 | A1 | 7/2004 | Park et al. |
| 2005/0007965 | A1 | 1/2005 | Hagen et al. |
| 2005/0033758 | A1 | 2/2005 | Baxter |
| 2005/0084232 | A1* | 4/2005 | Herberger et al. ............ 386/4 |
| 2006/0251382 | A1 | 11/2006 | Vronay et al. |
| 2006/0251383 | A1 | 11/2006 | Vronay et al. |
| 2006/0251384 | A1 | 11/2006 | Vronay et al. |
| 2007/0130015 | A1* | 6/2007 | Starr et al. ............ 705/14 |
| 2008/0074487 | A1 | 3/2008 | Ryckman |
| 2009/0046139 | A1 | 2/2009 | Cutler et al. |
| 2009/0172779 | A1 | 7/2009 | Hegde et al. |
| 2009/0282103 | A1 | 11/2009 | Thakkar |
| 2010/0103245 | A1 | 4/2010 | Decker et al. |
| 2010/0302346 | A1 | 12/2010 | Huang et al. |
| 2011/0196688 | A1 | 8/2011 | Jones |

OTHER PUBLICATIONS

"'Your Show' turns Facebook news feeds into a personal TV show," LATimes.com story published Feb. 26, 2013 at latimes.com/business/technology/la-fi-tn-your-show-facebook-social-studios-20130226,0,2519998.story.

Printout of webpage at http://corp.eyejot.com/?page_id=109 on Apr. 3, 2013.

Printout of webpage at http://corp.eyejot.com/?page_id=15 on Apr. 3, 2013.

Printout of webpage at http://www.poptent.com/our-solution on Apr. 3, 2013.

Printout of webpage at http://www.poptent.com/our-solution/crowdsourced on Apr. 3, 2013.

Printout of webpage at http://www.magisto.com/ on Apr. 3, 2013.

Prarthana Shrestha, Peter H.N. de With, Hans Weda, Mauro Barbieri, and Emile H.L. Aarts. 2010. Automatic mashup generation from multiple-camera concert recordings. In Proceedings of the international conference on Multimedia (MM '10). ACM, New York, NY, USA, 541-550. DOI=10.1145/1873951.1874023 http://doi.acm.org/10.1145/1873951.1874023.

Printout of webpage at http://www.talkfusion.com/home.asp on Apr. 3, 2013.

Printout of webpage at http://www.talkfusion.com/product/video_newsletters/ on Apr. 3, 2013.

Vilmos Zsombori, Michael Frantzis, Rodrigo Laiola Guimarães et al. (2011) "Automatic Generation of Video Narratives from Shared UGC", 325-334. In Proceedings of the 22nd ACM conference on Hypertext and hypermedia (HT '11).

Bilibon H. Yoshimi and Gopal S. Pingali, "A Multimodal Speaker Detection and Tracking System for Teleconferencing", Multimedia '02, Dec. 1-6, 2002, Juan-les-Pins, France, ACM.

International Search Report and Written Opinion in corresponding PCT application serial No. PCT/US2011/027624.

\* cited by examiner

GENERATION OF COMPOSITED VIDEO PROGRAMMING

This application is a continuation in part of U.S. patent application Ser. No. 13/043,446, filed on Mar. 8, 2011, which claims the benefit of U.S. Provisional Patent Application Ser. No. 61/311,552, filed on Mar. 8, 2010, and titled "Auto-Editing Multiple Video Streams into a Single Composite Video". Each of the foregoing applications is incorporated by reference herein as though set forth herein in full.

FIELD OF THE INVENTION

The present invention pertains to systems, methods and techniques for creating various kinds of composited video programming, such as: video messages and blogs made up of one or more of video feeds; talk-show programming, particularly for cases in which the participants are geographically dispersed and are participating using an ordinary computer or even an ordinary telephone and have access to just ordinary residential Internet access; and various other kinds of video programming in which one or more video feeds are combined together and/or combined with stylistic design elements.

BACKGROUND

A variety of different software applications and services exist for allowing geographically dispersed individuals to communicate with each other. Examples include conference telephone calls and Internet-protocol audio or audiovisual communication sites and systems, such as Skype™ or Google Talk™. However, the present inventors have recognized that there is no good, inexpensive and convenient way to both record those conversations and then use the recordings to produce high-quality video content, particularly in a talk-show format, for subsequent distribution.

In addition, the present inventors have discovered that there is a great need for automated production of high-quality video programming, where the user can provide one or more video feeds and automatically have a professional-looking and/or even branded show created around such content.

SUMMARY OF THE INVENTION

According to one representative embodiment, the present invention is directed to a system for creating talk shows and other video programming, including: (a) a processor-based production server; (b) a host processor-based facility configured for: (i) accepting inputs of content and stylistic information for designing a composited video program, (ii); and electronically transferring the content and stylistic information to the processor-based production server; and (c) a plurality of participant processor-based devices, each associated with a user. The host processor-based facility and a set of the participant processor-based devices are configured: (i) to communicate with each other over an electronic communications network as participating devices in a live conference that includes audio communication, with each of the participating devices transmitting a live first data stream; and (ii) to transmit a second data stream to the processor-based production server, with both the first data stream and the second data stream representing a corresponding user's participation in the live conference. In addition, the processor-based production server is configured to receive the second data streams and assemble them into a final composited video program using the content and stylistic information.

According to another representative embodiment, a system for creating video programming is provided. The system includes: (a) a processor-based production server that has access to a library of existing styles for wrapping around video, each of such styles including a specific arrangement of design elements; (b) a processor-based contributor device configured to accept input of video content and electronically transfer such video content to the production server via a network; and (c) a processor-based administrator device, providing a user interface that permits a user to: (i) design new styles and modify the existing styles, (ii) specify rules as to when particular styles are to apply, and (iii) electronically communicate the new and modified styles and the rules to the production server. Upon receiving the new and modified styles from the administrator device, the production server incorporates them into the library to become part of the existing styles. The contributor device and/or the administrator device also is configured to provide user-specific information to the production server. The production server: applies the specified rules in relation to the user-specific information in order to select a style, applies the selected style to generate a completed show that includes the video content received from the contributor device, and makes the completed show available to the contributor device and/or the administrator device.

The foregoing summary is intended merely to provide a brief description of certain aspects of the invention. A more complete understanding of the invention can be obtained by referring to the claims and the following detailed description of the preferred embodiments in connection with the accompanying figures.

BRIEF DESCRIPTION OF THE DRAWINGS

In the following disclosure, the invention is described with reference to the attached drawings. However, it should be understood that the drawings merely depict certain representative and/or exemplary embodiments and features of the present invention and are not intended to limit the scope of the invention in any manner. The following is a brief description of each of the attached drawings.

DESCRIPTION OF THE PREFERRED EMBODIMENT(S)

The present invention provides, among other things: systems and methods for allowing multiple geographically dispersed individuals, who are engaging in a real-time (or live) audio or audiovisual conversation that is separately recorded and/or separately uploaded from the participants' individual sites, to have a high-quality program of that conversation produced quickly, easily and inexpensively; and an automated video-editing solution that combines multiple recorded videos pertaining to a single conversation into a fully edited, professional-quality composited video show or program. For purposes of the present invention, the term "audiovisual" is intended to mean a video signal together with one or more audio tracks or signals.

The real-time conversation itself can have any kind of desired format and can include any kind of communication among the participants. Examples can include a news-style interview, a "call-in" question-and-answer session, a panel discussion group, or just a group of friends chatting informally.

In any event, in the preferred embodiments, once all of the captured audiovisual (or audio-only) streams have been received by a central server, they are combined into a single, fully edited, professional-quality, composited video show or program using an automated editing tool, as described herein. Preferably, the auto-editing tool of the present invention is capable of processing multiple (e.g., 2-6, although any other number is possible) input audiovisual (or audio-only) streams that meet the following criteria:

All have been recorded from a single conversation conducted live, e.g., over video and/or audio chat.

Each contains a video from a single camera or other video source (typically of a single participant).

Each contains one or more audio tracks (e.g., mono or stereo) of that participant's part of the conversation.

The audio track(s) may contain noise, such as microphone feedback or speaker echoes from the other participants.

Based on such input videos, the auto-editing tool will output a single video that preferably meets the following criteria:

All (or at least multiple different ones of the) participants' videos appear in the frame at the same time, appropriately scaled and positioned, for all or at least significant portions of the video.

A background image or video is composited underneath (i.e., on a lower layer than) the participants' videos.

A frame image is composited above the cropped participants' videos.

The videos are trimmed (or temporally aligned with each other) as appropriate to ensure they are in sync (e.g., using metadata produced at the time of recording or by matching the audio tracks to a recording of the live conversation).

The dominant speaker at any point in time ordinarily is highlighted or emphasized in the frame, preferably by making the speaker's video window have the largest size, with the other video windows scaled down and/or placed away from the focal point.

System Overview.

Figure 1:
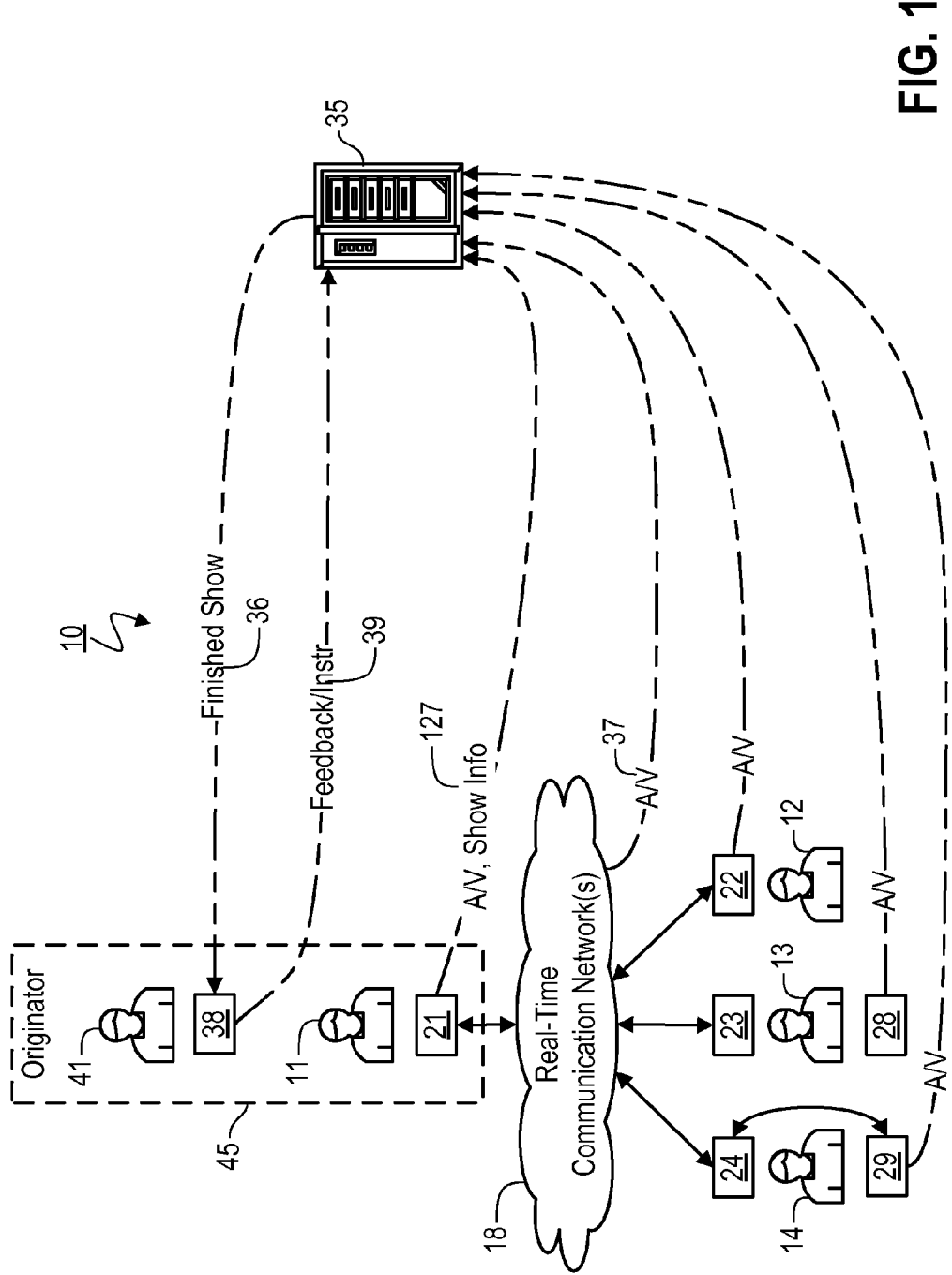
FIG. 1 is a block diagram of a system according to a representative embodiment of the present invention.

FIG. 1 is a block diagram of a system 10 according to a representative embodiment of the present invention. According to the most common embodiments of the present invention, multiple geographically dispersed individuals 11-14 talk to each other in real time through one or more communications networks 18 that are available to such individuals. Communications networks 18 can include, e.g., the Internet, local area networks, the public switched telephone network (PSTN) and/or one or more wireless networks, such an 802.11 network or a cellular-based network.

Preferably, one of such individuals is the host or producer (sometimes referred to as the hosting or producing participant) 11, and one or more of the other individuals are additional participants 12-14. Although three such additional participants 12-14 are illustrated in FIG. 1, any other number instead may be involved, although two or three presently are preferred.

More specifically, each of such individuals 11-14 preferably engages in a real-time conversation with the others through the use of a corresponding device 21-24. For example, in the present embodiment host 11 and participant 12 communicate through the use of general-purpose computing devices 21 and 22, respectively. Each of devices 21 and 22 could be, e.g., a laptop, desktop or tablet computer, a smartphone or other computing device capable of being held within a single hand, or any other general-purpose computing or processor-based device. In any event, computing devices 21 and 22 preferably run a participant application, providing functionality that is described in greater detail below. However, one feature preferably provided by the participant application is to permit the user to engage in real-time videoconferencing over the Internet, using the Internet protocol (IP).

Depending upon the specific embodiment, the other participants can engage in real-time communications over communications network(s) 18 in any of a variety of other ways, using any of a variety of different kinds of devices. For instance, the device 23 used by participant 13 might be an ordinary landline or mobile telephone, in which case the communications network(s) 18 (or some other component of system 10) typically would include a server that provides a telephone-conference bridge, incorporating audio from anyone who calls into the conference bridge telephone number, so that any individual with just a landline or wireless telephone connection can participate. In such a case, the server would act as a bridge between the telephone-only participants and the Internet videoconferencing participants, so that all could hear each other, but only the Internet videoconferencing participants could see each other in real time. That is, in the present example, participant 13, who is participating by telephone only, typically would not be able to see the other participants 11, 12 and 14 and, correspondingly, such other participants 11, 12 and 14 typically would not be able to see participant 13.

While real-time voice-and-video participation is desirable, it is also possible for some of the participants to join the conversation only through an audio link. Also, any or all of the participants may use any other means of real-time audiovisual or audio-only communication. In addition, it is noted that the same server that provides the PSTN-to-IP bridge or another server (e.g., if the embodiment does not employ a PSTN-to-IP bridge) can be used to facilitate the IP videoconferencing.

Irrespective of how the individual participants 11-14 communicate in real time, a separate audiovisual recording (recording of the video stream and audio) preferably is made of each participant. Preferably, such recording functionality is provided (e.g., either natively or through the use of a plug-in) within the participant application that is also used for participating in the real-time conversation. However, in certain embodiments the recording quality is significantly or substantially better than the quality of the audiovisual that is transmitted in real time to the other participants (the latter often being subject to more restrictive bandwidth limitations).

Even if a participant is not communicating via a videoconferencing application (e.g., because no Internet access is available at that time), the video of that participant preferably still is recorded using a recording application on his/her computer or other device, e.g., together with a computer microphone and a WebCam. For example, although participant 13 participates in the real-time conversation using a telephone 23, he or she also has available another device 28 (e.g., a desktop, laptop or tablet computer) that runs an application for making the recording. In preferred embodiments, this application is the same participant application discussed above for participants 11 and 12, but in this case it is operating in record-and-upload-only mode. It is noted that the recording of any given individual participant can be made in any other way, e.g., using a tripod-mounted camcorder, a flash-based video recorder or the recording functionality of a wireless phone. Also, in certain cases it might only be possible for a particular participant (e.g., participant 13) to record and/or upload his or her audio, and the present invention preferably accommodates this situation, as discussed in greater detail below.

Separately from the real-time communications, these audiovisual recordings (or in some cases, audio-only recordings) are uploaded (or otherwise transmitted) to a production server 35 that incorporates them into a final composited video program 36, preferably using a fully automated or almost entirely automated process, as discussed in greater detail below. For this purpose, the device 21 for the host 11 preferably also runs a host application (which could be integrated with the participant application into a single application) that inputs additional show information (sometimes referred to herein as template information) 127 from host 11 (e.g., through provided user interfaces), and is configured so as to cause device 21 to upload such additional show information together with the audiovisual stream for host 11. The show information 127 is used to affect other visual aspects of the finished show 36 and can include, e.g., show formatting and layout information, textual information to be used in captions and titles, selections to affect the operation of the automated editor, additional images and other content to be incorporated, information for specifying how the completed show 36 is to be designated, and the like. Background, frames, logo, caption and title characteristics, intro, outro, transitions, and all other stylistic selections for a composited video together can make up a style that preferably can be named and used for the present and/or future shows; thereafter, the host 11 may select a style when the real-time conversation is being scheduled or at any time thereafter. Additionally, default show information (e.g., based on a stored profile for the host 11, the originating entity 45 or the kind of show that is being created) can be drawn from outside sources (such as a website, a centralized database, a portal or a remote data store) and presented to host 11 through the user interface for review and modification. Production server 35 could be (or include) a Windows computer, a Macintosh computer, a Linux-based computer or any other type of computer, and need not be a separate computer, but instead, e.g., could be implemented as part of device 21, the host facility that includes device 21, device 38, an administrative facility that includes device 38, or any other computer or other device associated with the originating entity 45.

It is noted that in preferred embodiments separate data streams are employed—one that is used for real-time communications and one that is separately uploaded to production server 35—even though both represent the participant's interaction within the real-time conversation. Such separation has several benefits. First, as already noted above, it permits higher-quality audiovisual (or audio only) to be submitted to the production server 35 for use in generating the final composited video program 36, whereas the real-time stream may be limited due to bandwidth constraints and the fact that the real-time communication channel must simultaneously accommodate uploading and downloading of audio or audiovisual information from multiple participants. Second, even if the real-time data stream is sent at the same resolution that is used for producing the final composited video program 36, transmitting such information as a separate stream in non-real time often can avoid (or at least better deal with) problems associated with real-time communications, such as packet loss and the need for a much higher quality Internet connection than otherwise would be necessary. Typically, it is preferred that the uploading to production server 35 does not begin transmission until the subject participant's participation in the real-time conversation has concluded, thereby conserving bandwidth for the real-time conversation. However, if excess bandwidth is available during the real-time conversation (either continuously or from time to time), it might be preferable to begin the upload to production server 35 during the real-time conversation, using such excess bandwidth. Of course, if sufficient excess bandwidth is available, it might even be possible to significantly or entirely omit the recording step, or even to use just a single data stream for both purposes.

In any event, when the real-time conversation is completed, the recordings for all the participants 11-14 are gathered together. Preferably, the participant application described above automatically (or upon manual designation) uploads the recorded audiovisual (or audio-only) data to the production server 35, which might be operated by or associated with the show originating entity 45 or might be operated by a third-party entity. In certain alternate embodiments, only the information that was discarded for the purpose of compressing the original real-time audiovisual signal is transmitted after the conversation has been completed, thereby permitting reconstruction of the full-resolution stream while simultaneously reducing the required post-conversation bandwidth demands. On the other hand, if the audiovisual corresponding to a particular participant was recorded in a different manner, that participant preferably either uploads the resulting audiovisual production server 35 file to the central site or sends a CD, DVD, flash drive or other tangible medium containing the audiovisual file to a corresponding central location. In certain cases, a participant may have participated in the real-time conversation by telephone, e.g., because he/she did not have an Internet connection or a high enough bandwidth available at that time; in such a case, a separate audiovisual (or audio-only) recording preferably is made using his/her computer, microphone and WebCam, in which case this recorded information is uploaded as bandwidth becomes available.

Nevertheless, in some cases it might be desirable or even necessary to use the same data stream for both the real-time conversation and as input for producing the final composited video program 36. In such cases, any of the participating devices or networking servers can capture the corresponding audiovisual (or audio-only) stream for the subject participant(s) and then forward such data 37 to the production server 35 (or even serve as the production server 35 itself).

Once completed by production server 35, the final composited video program 36 preferably either is automatically forwarded to the device 38 of an administrator 41 or is made available on a server in a manner such that access to it, as well as ability to control it, is restricted to administrator 41 (e.g., through password and username credentials). In the preferred embodiments, administrator 41 is a separate individual from host 11, but both are associated with (e.g., employees or contractors of) the same originating entity 45. In this way, for example, a single large entity 45 can have multiple individuals functioning as hosts 11 and creating content for it, while centralizing control over how the produced shows 36 ultimately are used.

The discussion above focused on two types of interactions within the system 10. In one (used by participants 11 and 12), a single device is used both for the real-time communications and for recording and uploading the separate data stream to production server 35. In another (used by participant 13), one device is used for the real-time conversation and another is used for recording and uploading the separate data stream to production server 35. In this latter case, the two devices are entirely separate from each other. According to a somewhat different approach, a participant 14 uses two different devices 24 and 29 for these two different purposes, but in this case the devices 24 and 29 are able to communicate with each other, such as where device 24 is a wireless mobile phone and device 29 is a desktop or laptop computer, with the two devices being connected to each other via a local area network or a Bluetooth or other wireless or hard-wired connection.

Still further, in some cases, two or more of the participants might be in the same room, so that only a single communication link to an external network 18 is required for them. In fact, it is even possible for all of the participants to be in the same room, so no communication link to an external network 18 is required at all.

It should be noted that the structure described above and depicted in FIG. 1 does not necessarily imply that any particular entity controls any of the functional units. For example, some or all of the functionality ascribed to production server 35 may be owned and/or controlled by the originating entity 45, so that various individuals within the originating entity 45 are able to obtain intermediate information (e.g., all of the uploaded video streams and the cut instructions) and, in such cases, originating entity 45 can itself create the final production of show 36 (e.g., using its own creative input).

Figure 2:
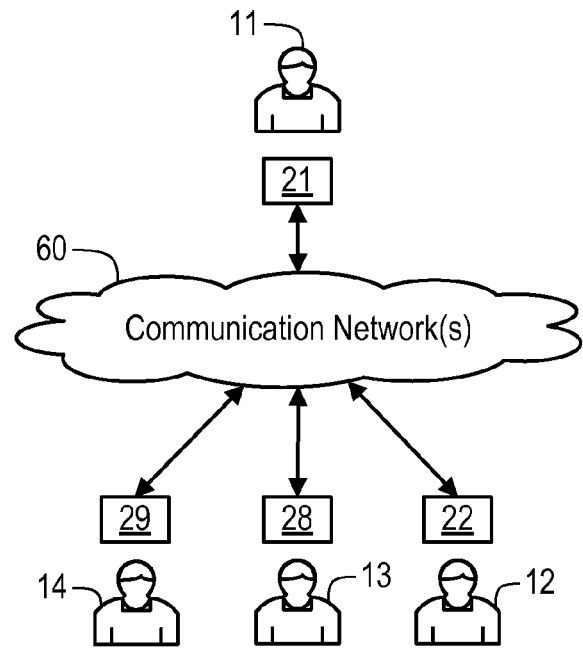
FIG. 2 is a block diagram illustrating additional communications between participating devices within a system according to a representative embodiment of the present invention.

In addition to the communications described above, it often will be the case that the host 11 will want to communicate with the other participants 12-14 in additional ways. For instance, in order to arrange the real-time conversation that forms the basis of the composited video program 36, the host 11 often will want to send out invitations to desired participants. Those individuals then will need to respond back to the host 11, and the ones accepting the invitation typically will round out the group of participants 12-14 (in addition to host 11) that engages in the real-time conversation. In addition, the other kinds of communications that are accommodated might include instant messaging (before, during or after the real-time conversation), alert messages regarding any changes in the scheduling of the real-time conversation, audiovisual (or audio-only) synchronization signals during the real-time conversation, and the like. These additional communications preferably also are accommodated by the participant application mentioned above. Thus, for example, as shown in FIG. 2, bidirectional communications of this type preferably also can occur between the host's device 21 and the users' devices running the participant application—devices 22, 28 and 29 in the present example—as well as among any combination of such devices 21, 22, 28 and 29, through one or more communications networks 60, which typically will include the Internet and also can include, e.g., any of the other kinds of networks mentioned above. In addition, in certain embodiments the host's device 21 has the capability of communicating with other devices that do not run the participant application, e.g., via short messaging service (SMS), e-mail, broadcast telephone messages, or any other electronic messaging system.

Figure 3:
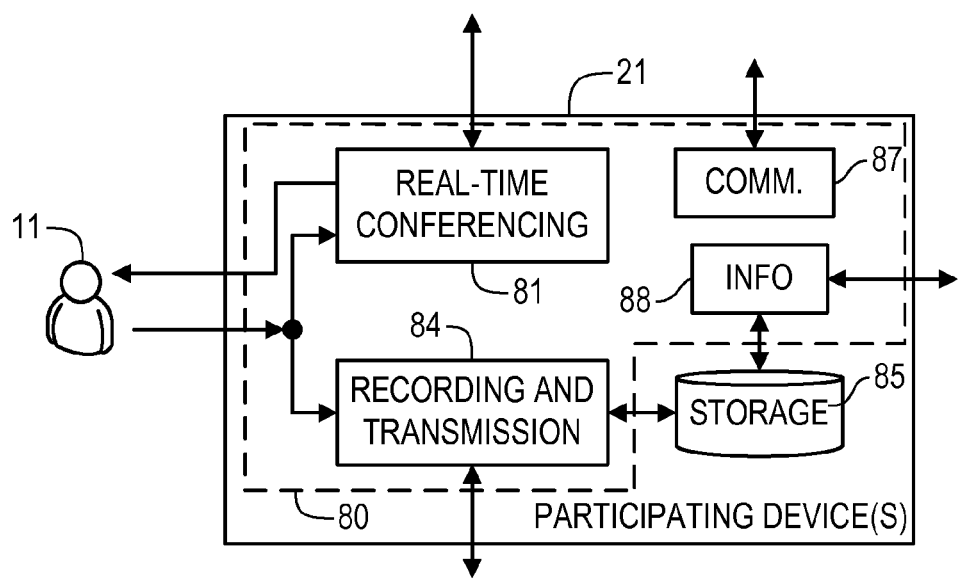
FIG. 3 is a simplified block diagram showing various components of one or more participating devices for interacting within a system according to the present invention.

FIG. 3 is a simplified block diagram showing various components of participating device 21 according to the present invention. It is noted that the functionality of device 21 described herein can be spread across one or more physical devices (collectively referred to herein as a "facility"). Similarly, the acts attributed to the host 11 herein may be performed by multiple different individuals; that is, host 11 can in fact be a group of people or just one individual. The same observations also apply to the additional participants 12-14.

As discussed above, device 21 runs a participant application 80 which provides the functionality discussed above. One component of participant application 80 is real-time conferencing component 81. Presently, a component built around AVSpeed™ is preferred. However, the conferencing functionality instead, e.g., could be provided through use of any other commercially available software and/or service. More specifically, software components that provide conferencing can be integrated, coordinated and used, or an existing turnkey conferencing system can be used.

Also included is recording and transmission component 84. Both real-time conferencing component 81 and recording and transmission component 84 preferably receive audio and visual information through other components of the device 21, although both (or in some cases just real-time conferencing component 81) might only receive audio. In the preferred embodiments, sound is input through the device's built-in microphone or through an external microphone and thereby converted into an audio signal, while visual information is input using the device's WebCam or other built-in or external camera, and thereby converted into a video signal.

In certain embodiments, real-time conferencing component 81 reduces the quality of the input audio visual information (e.g., through lossy compression, subsampling and/or filtering) prior to transmitting it for purposes of the real-time conversation. Such transmission can involve peer-to-peer video streaming and voice-over-Internet-protocol, or VoIP, and the real-time conferencing component 81 can receive and display/output the audiovisual streams from the other participants can be received in the same manner.

In many embodiments, the recording and transmission component 84 maintains the input audiovisual information at a higher quality level than the real-time stream output by the real-time conferencing component 81. That is, although compression optionally can be used prior to storage, any such compression preferably is less lossy than compression that would be used for the real-time conversation. In any event, its audiovisual stream preferably initially is placed on the device's storage 85 (e.g., memory or hard drive), and then is uploaded to the production server 35 in non-real time.

The upload can be performed using standard Internet file transfer technologies, such as FTP or HTTP post. To help ensure that the whole file transfers when disconnections are likely (either due to a balky Internet connection or if the participant prematurely shuts the computer off), the file preferably is uploaded in pieces, with upload of each piece being confirmed upon receipt (and/or with inquiry as to its upload status), or FTP upload resume (which currently is preferred) is used. A service may be called to communicate that an upload has been completed, or polling may be performed at the receiving end to detect completion of the upload.

Preferably also included in the participant application 80 is an automatically running service or daemon with the necessary permissions to access the directory/folder in which the local file is saved. Either a communication (signal, call, interprocess communication, etc.) can be made to indicate that the file is ready for upload or the service/daemon can detect when a file in the directory that was being written has been closed so it can be safely uploaded, and thereby eliminating the need to explicitly inform of readiness for upload. The service/daemon may also upload in pieces, as previously described. Because the upload preferably requires no user interaction, because the upload can take place even if the user has limited permissions, and because the upload can take place even if a different user with limited permissions logs in soon after a real-time conversation has ended, there is greater assurance that the file upload will take place. Identification for the uploaded file preferably is coordinated prior to the start of the real-time conversation so it can be known at time of file upload. However, such identification instead may be coordinated during or after the conference.

In certain embodiments, a second file containing metadata preferably is stored and uploaded by each participant's device 21, 22, 28 and 29 in the same manner as the audiovisual information. Such metadata can include, e.g., information on timing events that can only be known locally, such as information regarding the moment of synchronization, the time history of latency tests, selections made by the participant when setting up his/her local device, and/or an automatically gathered inventory of the device's configuration, capabilities, connections, etc. To optionally help with communication when polling is used at the receiving end to determine if an upload has taken place, the relatively small metadata file preferably is uploaded after all other files have been uploaded.

Communications component 87 preferably interfaces with the host 11 and provides for the additional communications mentioned above between the host 11 and the other participants 12-14. For example, communications component 87 preferably handles the transmission of show invitations to desired participants and receipt of responses to those invitations.

Information component 88 also interfaces with the participant 11, allowing the participant to input the additional information 127 for the show (e.g., formatting and layout) that was mentioned above. As a result, component 88 preferably is omitted from or disabled in the versions of the participant application 80 that is provided to the other participants 12-14. More specifically, component 88 preferably generates an additional metadata file that includes such input information 127 regarding the conversation/show. Such information can include, e.g., who the participants 11-14 are, the selection of a style to be used for creating the final composited video, names as they are to appear onscreen during the final show, etc. This file preferably also is uploaded in a manner similar to the other files. However, in alternate embodiments much of the information contained instead is gathered at a centralized location before the real-time conversation begins, during the real-time conversation, and/or after it has ended.

Figure 4:
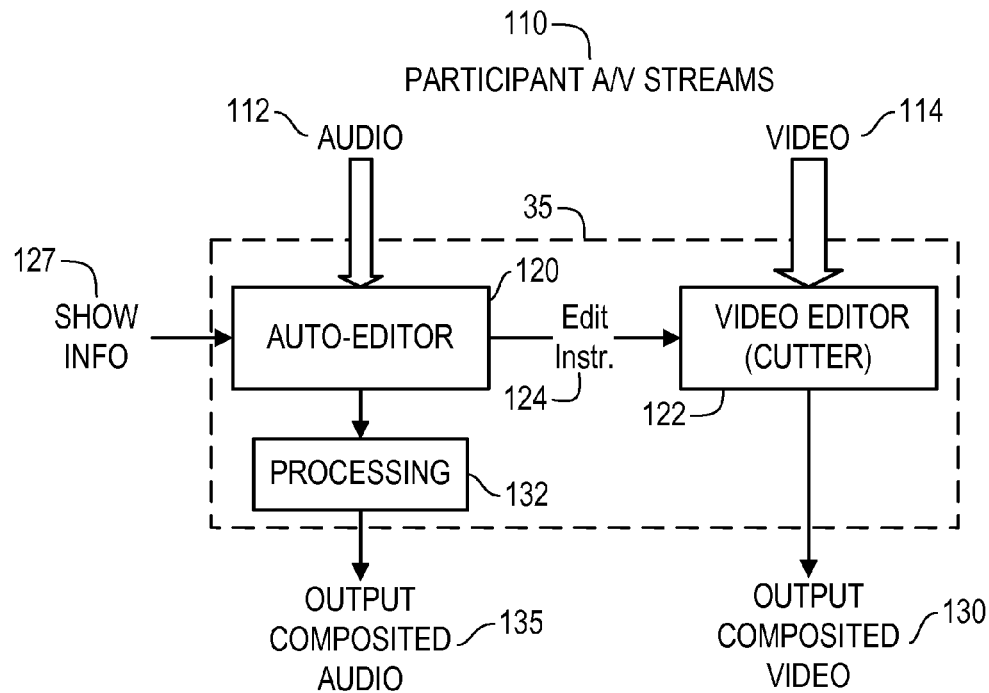
FIG. 4 is a simplified block diagram showing various components of a production server for use within a system according to the present invention.

A simplified block diagram showing certain components of production server 35, according to a representative embodiment of the present invention, is shown in FIG. 4. As illustrated, from the audiovisual data streams 110 that have been uploaded to production server 35 from the participants 11-14 (e.g., each as a separate file), the audio portions 112 are accessed by auto-editor 120 and the video portions 114 are accessed by video editor (sometimes referred to herein as the "cutter") 122. Auto-editor 120 is described in greater detail below, but generally analyzes the input audio signals 112 in order to identify who is speaking at different points in time and how the different video feeds 114 should be emphasized or deemphasized based on these speech sequences and then generates and outputs and a set of editing instructions 124 which incorporates the show information 127 (specified by host 11). Video editor (or cutter) 122 then follows the editing instructions 124 to generate the output composited video 130, dynamically changing how the multiple audiovisual files 114 are presented within an overall frame. That is, instructions 124 are used (among other things) to instruct the cutter 122 as to how to display the various video streams 114 into a composited video display. It is noted that FIG. 4 is a functional block diagram and the functionality depicted therein and described herein can be grouped or separated in any desired manner. For example, the cutter 122 often will also provide significant audio-processing capabilities and therefore will take on some or all of the functionality described herein for audio-processing module 132. Currently, Final Cut Pro™ is preferred as the cutter 122, although many other professional or nonprofessional video-editing applications, including Avid Media Composer, Adobe Premier and/or Linux-based Cinelarra, instead may be used.

The audio information 112 also is provided to processing module 132, together with some or all of the editing instructions 124 and, optionally, additional audio-only editing instructions generated within auto-editor 120, for any additional processing and for combining into a single output composited audio signal 135. In certain embodiments, audio information 112 is provided directly to processing module 132. However, in the present embodiment the audio information 112 is first processed by auto-editor 120 before being provided to processing module 132. As a result, it is possible to take advantage of the analysis performed by auto-editor 120 in order to improve the quality of output composited audio signal 135. For example, any sounds within a particular audio stream that have been determined by auto-editor 120 to be noise (e.g., sounds other than speech) can be muted (or zeroed out) or deemphasized before combining (or adding) that audio stream with the others to produce output composited audio signal 135. Also, if the auto-editor 120 has decided to focus on one participant over another but sound is emanating from both, sound from the one not selected can be deemphasized by the auto-editor 120 or the audio-processing module 132. In another example, intro video might be instructed to end prior to intro audio. In addition, at least some of the editing instructions 124 also are used for a similar or related purpose to generate output composited audio 135. For instance, editing instructions 124 might instruct a transition from a visual introduction to the conversation itself, but also instruct the audio for the introduction to continue and overlap a portion of the conversation content for a short duration, fading out to act as a bridge between the intro and conversation content. It is noted that some or all of the functionality of audio-processing module 132 can be performed by cutter 122.

In the preferred embodiments, each of auto-editor 120, cutter 122 and processing module 132 is implemented by running a set of computer-executable process steps on a general-purpose processor. However, each instead may be implemented in any of the other ways described herein.

Generation of a Multi-Participant Composited Video.

The auto-editing tool 120 can be controlled by a user at a remote site or, more preferably, runs entirely automatically (e.g., as a custom script). In either event, auto-editing tool 120 preferably performs the following steps, with reference to FIG. 5, although not necessarily in the exact order indicated.

Figure 5:
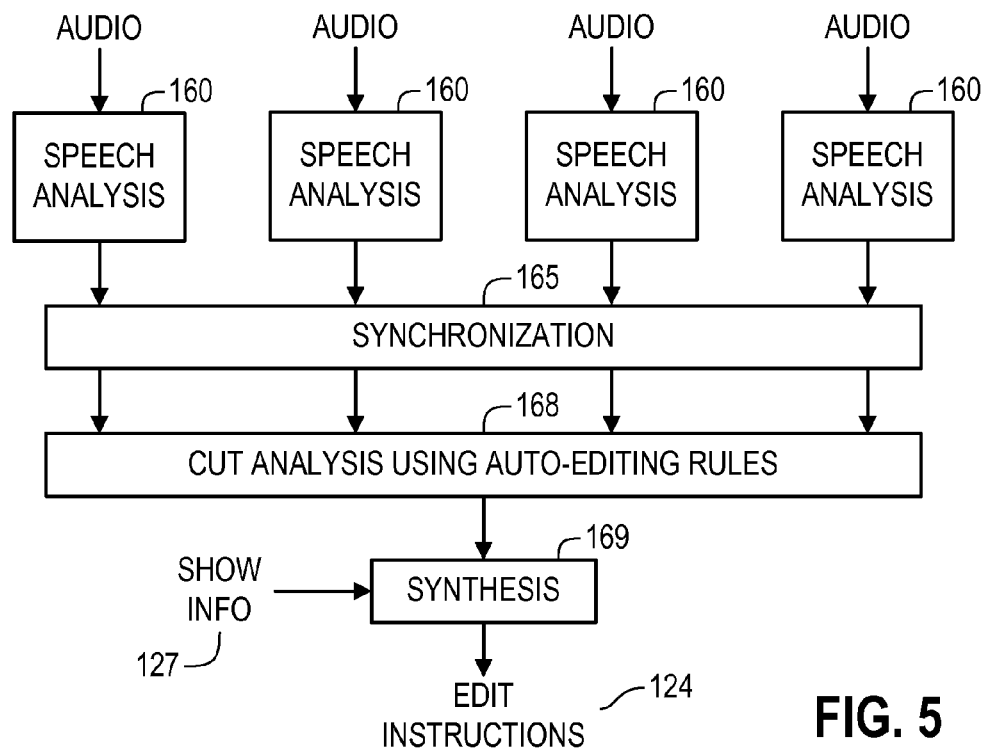
FIG. 5 is a block diagram illustrating the generation of video "cut" instructions based on input audio signals according to a representative embodiment of the present invention.

In the first major step, the audio tracks for each of the individual participants 11-14 is separately analyzed in a corresponding identical speech-analysis processing block 160 in order to determine when such individual participant was speaking As indicated in FIG. 5, the speech analysis 160 can be performed independently on each of the input audio streams (each received from a different one of the participant 11-14). Accordingly, each such analysis can be assigned to a different processor (or set of processors) in order to expedite the processing. Any combination of the foregoing techniques can be used for such speech analysis 160.

Figure 6:
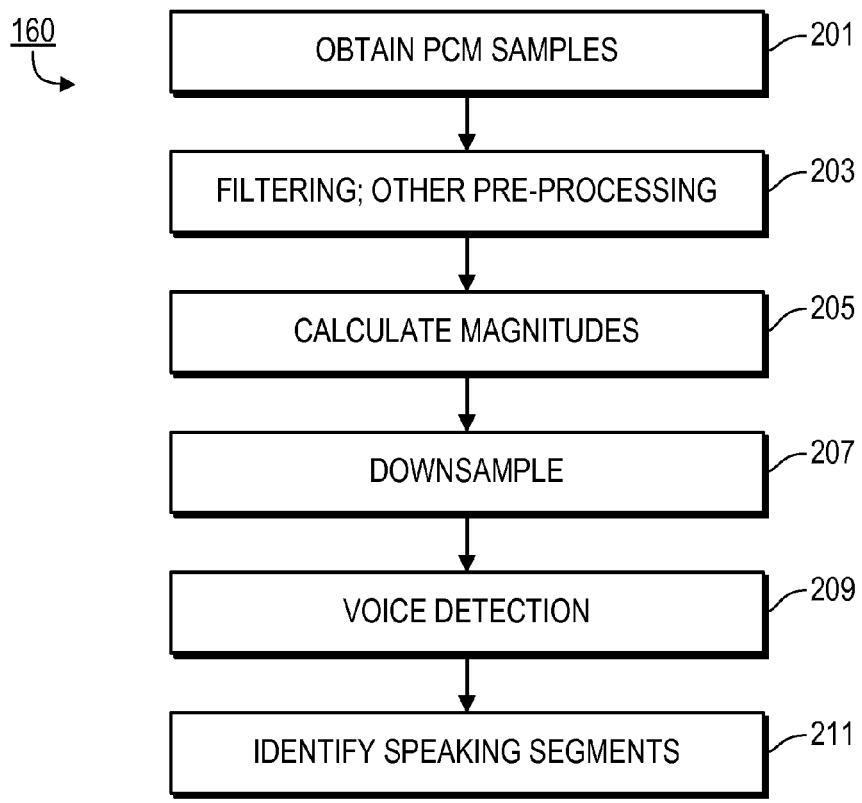
FIG. 6 is a flow diagram illustrating speech processing according to a representative embodiment of the present invention.

Preferably, speech-analysis processing block 160 is configured so as to perform the following steps, with reference to FIG. 6.

Initially, in step 201 the pulse coded modulation (PCM) samples (usually 44,100 samples/sec) for the audio track currently being processed are obtained (e.g., either directly or by performing any necessary decompression and/or decoding).

In step 203, any desired filtering or other pre-processing is performed. For example, in certain embodiments the average value of the signed waveform is calculated (over the entire signal or over identified individual segments of the entire signal) to estimate any DC offset, which is then subtracted from the waveform before performing the other steps described below. In this regard, it is noted that a DC offset, although inaudible, often can throw off the assessment of sound activity by inappropriately increasing the calculated statistical values.

Similarly, in situations where persistent single-frequency noise (e.g., 50 Hz, 60 Hz, 100 Hz or 120 Hz buzz) is detected, or otherwise known or suspected to exist, in the audio signal, one or more notch filters optionally may be used to reduce or eliminate such noise from the audio signal prior to further processing. Detection of such noise can involve, e.g., performing a frequency analysis over durations of several seconds each, noting strong single peaks and checking the time history of these peaks. If the time history shows that a peak for a given frequency is steady or regularly repeating, then that frequency preferably is determined to be other than a person's voice and so it is removed (e.g., using a notch filter) before processing the audio signal further.

Still further, because significant energy in human voice does not typically exceed a well-accepted frequency level, in certain embodiments the audio signal is passed through a lowpass filter e.g., with a knee of approximately 4,000 hertz (Hz). One benefit of doing so is to de-emphasize the sound energy of clicks, taps, bangs, plosive bursts, knocking, tapping, and other sounds outside the speaking range. It is noted that the lowpass filter could have its knee at other frequencies, e.g., from 1,500 Hz to 5,000 Hz without substantially affecting the result; however, female voices generally will be more affected with lower knee values. In addition, the lowpass filter could be replaced with a bandpass filter (e.g., with a passband from 20 Hz to 4,000 Hz), or with multi-pole or other higher-order filters.

In step 205, the PCM samples (either with or without such pre-processing) are then converted to magnitudes, preferably by taking their absolute values, although any other approach to determining the magnitudes instead could be used. Sound intensity or sound pressure level (other traditional measures) are proportional to the square of the waveform. However, depending upon the subsequent processing, squaring the waveform often makes the characterization of sound activity less sensitive to quieter sounds in the recording. On the other hand, emphasis of louder sounds due to squaring can be capped to help limit the effects of temporary loud sounds, as discussed below.

In certain embodiments, the magnitudes are indicative of perceived loudness. In this regard, it is known that sound is perceived differently at different frequencies. Thus, the calculated magnitudes can take this known frequency-based mapping of calculated sound pressure levels to perceived loudness into account.

In step 207, the magnitudes preferably are downsampled by summing or averaging them over relatively short contiguous time intervals (e.g., every half second or second), such as by averaging every 22,050 samples (assuming half second intervals and 44,100 samples/sec) in order to convert the magnitude values in each such interval into a single value. The result of this calculation can be used as a measure of sound activity during the interval. The downsampling operation allows the process to ignore the effects of voice modulation, bursty noise, etc., as well as making the subsequent computations faster. Also, it should be noted that the interval need not be kept as a fixed value. A smaller or larger interval may be specified. A suggested interval size may be specified that is adjusted so that an integral number of intervals can be placed one after the other to equal the amount of media available.

In step 209, voice detection is performed. One approach relies on threshold calculation and application. Initially in this regard, statistics on sound activity preferably are gathered over the entire recording (or over individual identified segments of it). In preferred embodiments, a representative value (more preferably a mean or average) and a measure of variability (more preferably, a standard deviation) are determined. Based on these values, one or more thresholds preferably are set.

More preferably, a low threshold preferably is set at approximately 0.35 times the standard deviation below the mean (e.g., a value from 0.25 to 0.50 or, more preferably, from 0.30 to 0.40 of a standard deviation below the mean). During any interval in which the value is below the low threshold, it preferably is assumed that there is no speech-related sound activity in the interval and, therefore, the value preferably is set to zero (thereby eliminating non-speech noise). It is noted that segments of downsampled magnitude values above the low threshold generally are assumed to correspond to time periods during which the subject participant was speaking However, in certain embodiments, use of the low threshold only provides a tentative determination, and subsequent speech-identification processing is used to determine whether speech actually exists during those time segments.

Similarly, the effects of any remaining bursty sections (e.g., from microphone bumps or feedback) can be limited by capping the individual downsampled magnitude values at a maximum of a specified high threshold (e.g., approximately 4 standard deviations, or from 2.5 to 4.5 standard deviations) above the mean.

Also, it is noted that the foregoing threshold-related sub-steps (performed in this step 209) may be performed in different orders and/or iterated. For example, in certain embodiments, immediately after calculating the standard deviation, the high threshold is applied and then the mean is recalculated using these capped values before calculating and applying the low threshold.

Setting a threshold below which participation is assumed to be absent based on data from the entire audio track can introduce characteristic editing errors. For example, if a participant typically is quiet or monosyllabic in his or her infrequent utterances, the threshold will be set so low that almost no sound will be rejected. Circumstances can arise where the sound of an air conditioner's fan, or the quiet sound of a distant emergency vehicle's siren, can be assessed as significant participation. Conversely, if a participant typically is loud, talks often, and dominates or interrupts, the threshold will be set so high that often significant utterances will be classified as silence.

Use of a voice-activity detector can address these problems. Voice-activity detectors are the subject of research in several industries. The implementations described below have been found to function well. Once implemented, only those portions of the soundtrack that contain detected voice activity need be further assessed and, optionally, any sounds that do not correspond to detected voice activity can be zeroed out or deemphasized (e.g., by reducing its volume), with the latter approach providing a subsequent viewer with insight into what is going on without letting non-speech sounds dominate the presentation. Sometimes these otherwise extraneous sounds can give a sense of space or location. Thus, the foregoing threshold-based approach may be replaced with any of the following voice-activity detection processes. However, it should be understood that voice-activity detection is not perfect.

Through testing it has been found that when several intervals of detection were found adjacent to each other without interruption the quality of detection was improved. This would indicate continuous vocalization by the speaker through the intervals, rather than either brief vocalizations of little editing consequence or sounds mischaracterized as speech that were intermittent or singular events. For present purposes, as discussed in greater detail below, it typically is more important to identify longer segments of vocalizations, so any inaccuracies with respect to short vocalizations often will be irrelevant.

According to one voice-activity-detection approach, based on conventional basic research, Cepstral analysis is performed. In this regard, most of human speech is made up of low-frequency vowel-like sounds. Human speech also is marked by a strong fundamental frequency and its harmonics. Looking at a spectrogram (a representation of the sound spectrum over time) of human speech will reveal speech to be mostly at a fundamental frequency with harmonics at a regular interval, when frequency is presented logarithmically. When presented this way, human speech would come across as pulses of energy at regular intervals at each moment in time. Pulses of energy at regular intervals itself looks like a signal that has its own frequency. This approach is known as Cepstral analysis, where peaks can be correlated with the fundamental frequency of a voice-like sound. By calculating the Cepstrum over sequential intervals it is possible to detect when vowel-like vocalizations are being made. For example, an interval of 30 ms can be used to evaluate the harmonic content of a recording, although a different interval size instead could be used, as long as the vocal frequency range is well-represented (typically, an interval of 20 milliseconds (ms) or larger, although it has been found that smaller intervals are better for detecting the changing nature of vocalized sound.). Also, overlapping intervals instead could be used. Some consonants may interrupt creation of vowel-like sounds, but the interruptions are brief and typically only affect one small (e.g., 30 ms) interval. Vowel-like detection across several contiguous intervals (at least three or four 30 ms intervals) are significant. Significant vowel-like sounds adjacent to each other, or separated by one 30 ms interval for short runs, or one or two 30 ms intervals for longer runs, help to identify voice activity.

Another approach, also based on conventional basic research, focuses on near-field sound detection. Unfortunately, sometimes a participant's microphone picks up the sound of people talking in the background, or what ends up sounding like an echo from the headset, earbuds or system speaker. These are human vocalizations too, but are not sounds that should influence the editing process. Often their reduced volume can make them insignificant for editing purposes. However, when they are loud enough, they can interfere and lead to inappropriate editing decisions. In such cases, if it is assumed the participant's sound is being picked up by a nearby microphone (perhaps a boom mike near the mouth), the quality of the locally picked-up voice can be used to differentiate it from background sounds. It is known that glottal (throat) vocalizations are better picked up by a nearby microphone than by a distant microphone. Human voice sensed by a nearby microphone will have relatively high sound level spikes when glottal vocalizations are made, as compared to glottal vocalizations from more distant sound sources that will tend to be at a level closer to the overall sound. It turns out that Linear Predictive Coding (LPC), used in speech processing and transmission, represents glottal vocalizations in its residual. By performing LPC on the participant's recorded sound, taking the residual, and then looking how "peaked" its distribution is, a distinction can be estimated between local vs. remote utterances. The greater the peak of the distribution (i.e., the greater the concentration of energy near the peak), the more likely a nearby speaker made the sounds. The "peakiness" of a distribution can be characterized by its kurtosis. The present inventors have evaluated the kurtosis of the LPC residual where vowel-like sounds were identified to help characterize them as likely speech from the participant that should influence editing, as opposed to background sounds to be ignored or paid less attention to when making editing decisions.

Another approach, also based on conventional basic research, focuses on echo cancellation. When sound leaks through from the headset, earbuds or system speakers, an echo could be present. This echo could be of the participant's voice or it could be of the voice of a distant participant, delayed through latency and considered an echo when audio tracks are compared with each other. It often is desirable to recognize the presence of such echoes and to discount them when making editing decisions. Echo detection can be accomplished by running an autocorrelation (for the echo of the participant's voice) or a correlation between the recordings of different participants. However, the same problem generally can be addressed by using earbuds or headphones rather than system speakers, reducing the influence of echoes in locally made recordings.

A still further approach, conceived by the present inventors, focuses on clustering. A well-made soundtrack has good signal-to-noise ratio. This means the participant's voice plays back as louder and stronger than what is heard when the participant is not talking A generally quiet participant will speak every so often. A generally talkative participant will speak very often. It is difficult to use overall statistics and thresholding to figure out where there certainly is no speech. Instead, a clustering approach such as k-means clustering is used. The anticipated number of groups is not specified in advance (or is overspecified), so the naturally significant number of clusters can be determined. There will be a cluster associated with the least amount of sound energy. This cluster corresponds to no speaking by the participant. If the second lowest cluster has a mean very close to the lowest cluster, it too may indicate no speaking by the participant. The intervals in this/these cluster(s) can be used with other voice-activity-detection approaches to make certain that clusters with no speaking are not considered as sources of significant sound when making edit decisions. Verification preferably is performed in case a participant talks the entire time by comparing to the results of Cepstrum-voice-activity detection (as discussed above). There should be little to no overlap between where voice is detected using the Cepstrum and the lowest cluster here. A similar verification preferably is performed in case a participant was silent throughout a conference. If there is overlap, it is preferred to always defer to possible speech presence rather than mask out using the lowest cluster, so as to not miss a chance at speech.

In step 211, speaking segments are identified, based on the temporal ranges that were determined in step 209, that include the participant's voice. Preferably, such ranges are supplemented and strung together by combining them with any intervening short pauses (i.e., ranges that were determined in step 209 not to include the participant's voice). More preferably, short pauses (e.g., not greater than a specified duration, such as anywhere from 0.5-3.0 seconds, or 1-6 0.5 second intervals) between two otherwise adjacent speaking ranges are combined with such otherwise adjacent speaking ranges in order to identify a single speaking segment. That is, such short pauses are simply deemed to be part of a larger speaking segment.

At the same time, in certain embodiments very short speaking ranges (e.g., not greater than approximately 0.5-3.0 seconds in duration and, more preferably, not greater than 1.0 second in duration or two 0.5 second intervals) preferably are discarded from consideration. However, elimination of very short speaking ranges during speech analysis 160 (i.e., for a single participant's audio) is not currently preferred.

Referring back to FIG. 5, in the preferred embodiments, synchronization 165 of the audiovisual signals from the various participant 11-14 also is performed using the input audio signals. Although shown as occurring subsequent to speech analysis 160 in FIG. 5, it instead could be (and in fact currently is preferred to be) performed prior to speech analysis 160.

Generally speaking, synchronization 165 involves aligning all of the audiovisual streams so that for each point in the real-time conversation it is possible to very accurately identify the same time point in each of the audiovisual streams. Preferably, this alignment or synchronization is performed on a fully automated basis. Currently, the preferred approach is based on the use of a standardized external time source.

Synchronization typically has two aspects: determining when synchronization takes place and communicating when synchronization has taken place. For communication of synchronization to be meaningful, it must have a known and precise relationship with the captured video and sound of the participant (or of anything else that is being shared with the other participants during the real-time conversation, such as audiovisual or other kinds of reference materials). Not being able to infer the location in the audiovisual stream to within a frame or so of where a communicated synchronization moment takes place undermines the communication and can undermine the subsequent editing process too (with more accurate synchronization typically resulting in faster interactions that can be reliably edited without human intervention).

Ideally, during the real-time conversation the host's device 21 would signal the moment of synchronization to the other participants' devices, and then all of the participants 11-14 would simultaneously record the synchronization point into their audiovisual streams so that such streams could be easily aligned later. However, communication latency would cause the synchronization moment to be perceived differently by each participant's equipment.

To overcome this problem, an advance reservation system approach preferably is incorporated into the participant application 80. In advance of the synchronization moment, the host's device 21 informs the other participants' devices 22, 28 and 29 that are running the participant application 80 when, in the near future, synchronization is scheduled to take place, as if a "reservation" were being made. Each participant's device 21, 22, 28 and 29 (including that of the host 11) queries an Internet-connected Network Time Protocol (NTP) server for the current time. The report of current time received back includes an estimate of latency between the requesting device (21, 22, 28 or 29) and the remote NTP server, allowing the provided time from the NTP reference to be adjusted for greater accuracy. The participant application 80 running on the participant's device (21, 22, 28 or 29) then: (1) calculates the amount of time to wait until the synchronization moment that has been reserved takes place; and (2) starts a high-accuracy timer with sub-frame resolution that completes at the synchronization moment. It is noted that the embodiments described herein are merely exemplary and that, for example, synchronization signals can originate from anywhere within system 10 (e.g., from real-time communication servers within communication network(s) 18 or 60.

Communication of the moment of synchronization, relative to the saved audiovisual stream, preferably is done in one of three ways. In the present case, communication of the moment of synchronization is relative to recordings of the participant. However, there is a concern with timing derived from events deep within a saved audiovisual stream. Specifically, there is a startup period during which an indeterminate amount of time passes before audiovisual information is actually saved: the camera might not be ready, the processing chain might not be primed, and real time might not correspond to the recorded time. The recording of a live participant input gets buffered, chunked and processed along a chain as it gets compressed and locally saved to a file. It is difficult to accurately correlate time as experienced by a participant with time as recorded through the audiovisual data processing chain. Additional uncertainty is added during transcoding prior to editing. Communicating synchronization by inserting information along the processing chain therefore can result in uncertainty when it comes to pointing within the decompressed media at the time of merging the audiovisual streams from the different participants.

If the errors introduced in the processing chain were constant or predictable, and if they could be determined for every participant's device and configuration, perhaps they could be undone to allow for reliable communication of the moment of synchronization by embedding information in the processing chain. Likewise, if the introduced uncertainties were so small as to not be significant, then communication of synchronization could be injected without concern at one of a number of points prior to saving the compressed audiovisual file. This situation would also open up the possibility for allowing metadata to point to the location in the audiovisual stream that synchronization took place.

However, significant differences in fact can be observed during testing of different devices in different locations, making it difficult to reliably correlate real-world time with a particular frame or moment in the audiovisual stream. For these reasons, the preferred approach is to insert a synchronization signal into the audiovisual signal itself, prior to such processing, so that the synchronization signal stays locked in synchrony with the captured participant video and audio through the entire processing chain. Modification of the captured video, modification of the captured audio, overlay of a video mark, video substitution, mix-in of an audio signal, and audio substitution all are possibilities for doing so.

However, mix-in of an audio signal, or making a mono recording of the participant in one channel and placement of communication of synchronization in the other channel, currently is preferred as being the easiest to implement and then to detect during the editing process. In either case, audio is inserted early on (e.g., shortly after the participant's audio was captured, prior to most or all of the subsequent processing) as if it were participant vocalization. That is, instead of trying to get a synchronizing sound signal to enter through the microphone, it is injected into the soundtrack programmatically. When a stereo track has microphone information in one channel and programmatically created sounds in the other channel, they create a stereo pair that remain locked with each other through subsequent processing steps.

Another method of communicating the synchronization point, currently less preferred because it is contingent on the processing chain introducing minimal inconsistencies, is to prime the recoding process (e.g., start the processing chain, let it get past initializations, buffer fills, etc.), place the processing chain on hold (e.g., pause it and hold it ready to start again on command), then either eliminate what has been saved so far so the start of the saved file can communicate the moment of synchronization, or save metadata or insert a marker outside the audiovisual stream indicating how deep into, or where in the recording the synchronization point takes place.

According to another method, where the saved file can include reliable timing information for purposes of synchronization, real-world time is saved in the audiovisual stream itself, perhaps taken from the system clock after synchronization with an NTP server. However, some attractive file formats used to save locally recorded content might not be designed to include timing information for purposes of synchronization. They might play back at a sufficiently reliable pace but might not offer a native ability to correlate a time in the audiovisual stream with a real-world time.

Once the synchronization information has been properly embedded into the individual audiovisual streams during the real-time conversation, e.g., as described above, synchronization of those audiovisual streams in step 165 can be performed in a straightforward manner by aligning the different time-based signals so as to match up at the specified synchronization point(s). In this regard, although it is possible to use just a single synchronization point during a real-time conversation, use of multiple synchronization points can address any tendency of the signals to drift out of synchronization during the course of the conversation. Also, in the preferred embodiments, as discussed in greater detail below, the host 11 (through his or her device 21) starts a process that provides a countdown to all participants to indicate when the live conference is to begin, which is the equivalent to when useful content may start to be created. Synchronization and communication of synchronization can take place during the countdown period without the participants 11-14 being aware, or it might take place in advance. Metadata preferably is used to communicate to the auto-editor 120 where to start looking for useful content. In addition, the actual start of useful content can be automatically adjusted further by the other techniques described below.

Figure 7:
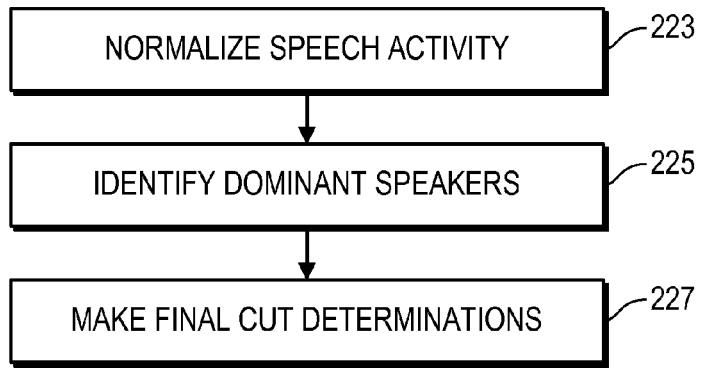
FIG. 7 is a flow diagram illustrating the generation of "cut" instructions according to a representative embodiment of the present invention.

Upon completion of synchronization in step 165, "cut" analysis is performed in step 168 by applying automatic editing rules to the synchronized speech-detection-processed audio signals in order to generate a set of "cut" instructions. In this regard, it was discussed above how each of the speech-analysis modules 160 outputs information indicating when the corresponding participant is speaking Based on this information, module 168 determines which, if any, of the participants should receive the main visual emphasis (e.g., by enlarging the person's frame and/or moving it to be focal point) in the composited video display 130 at each point in time. In the preferred embodiments, this analysis is performed as follows, with reference to FIG. 7.

Initially, in step 223, each participant's audio signal optionally can be preprocessed by grading it against itself, bringing about normalization. In this case, each participant's significant sound activity preferably is mapped on a fixed scale (e.g., from 0 to 10, with 0 corresponding to no significant sound activity, 1 corresponding to the least emphatic significant sound activity and 10 corresponding to the most emphatic significant sound activity). Then, when two or more participants have significant sound activity during the same interval, this normalized significant sound activity can be compared, and the participant with the greatest normalized value determined (or partially or tentatively determined) to be dominant speaker.

In step 225, the "dominant speaker" is identified for each subsample interval in the audio signals (or, more generally, for each point in time during the conversation). Ordinarily, this dominant speaker will be the one highlighted in the final composited video display. However, as discussed in more detail below, under certain circumstances the auto-edit tool 120 preferably will shift away from the dominant speaker (e.g., to highlight another participant's reaction, in certain embodiments using facial and/or expression recognition to identify the best participant for this purpose). When there is only one participant with an indication of speaking, that participant preferably is identified as the dominant speaker for that interval.

When two or more simultaneous speaking ranges show activity during an interval, a dominant speaker preferably is selected from among them. A number of different rules for identifying the dominant speaker in this situation, as well as for deciding upon cuts, are described herein. In some cases, those rules will conflict with each other. One approach for handling conflicts is to rank the rules so that the highest-priority rule decides the matter unless application of it is not conclusive (e.g., in the event of a tie), in which case the next-highest-priority-rule is applied, and so on down the line. For instance, if two or more participants are tied for the same greatest normalized speech-activity value, then the louder (non-normalized) participant might be selected as the dominant speaker. Alternatively, a score can be associated with each rule, and the results from application of all of the rules are aggregated to determine an aggregate score for each participant, such that the participant with the highest aggregate score is considered to be the dominant speaker at that point in time.

Still further, certain rules may be applied only conditionally. For example, in the preferred embodiments the highest-normalized-significant-sound-activity rule is only applied to situations in which two participants speak over each other for a minimum specified (e.g., extended) period of time. Then, the absolute (non-normalized) significant-sound-activity rule might be applied only if that rule results in a tie.

Generally speaking, dominant-speaker conflicts are detected by finding all segments in which two or more participants' detected speech segments overlap. If the length of an overlap is very short (e.g., less than a specified duration, such as anywhere from 1-5 seconds) and a participant having a longer total speaking range that starts significantly before the shorter segment and ends significantly after it preferably is designated as the principal speaker during the period of the overlap. For example, assume that participant 12 is speaking for an extended period, then participant 13 interjects for one second, while participant 12 continues to speak for a while longer; in this example, participant 12 is the dominant speaker for his/her entire speech segment under consideration even if participant 13 was the dominant speaker during the interjection, e.g., because it would be inappropriate to cut to participant 13 for such a brief interjection. However, in certain embodiments this rule is modified, e.g., so that a participant having a sequence of such short overlapping speaking segments that have been identified to be sufficiently temporally close to each other is highlighted as the (or one of the) featured speakers; such a situation possibly indicates an intense dialogue between two of the participants.

Similarly, speaking ranges preferably are extended through silence. In other words, in the preferred embodiments the automated process prefers to stay on the current speaker rather than cut to a different speaker.

The determination of the dominant speaker is primarily concerned with the period of overlap. If a participant's speech segment extends before or after the overlap interval and the conflict rules determine another participant to be the principal speaker during the period of overlap, the participant still can be the primary speaker during that portion of the participant's speech segment extending outside of the overlap interval, e.g., provided such remaining portion satisfies the minimum-duration rules. For example, consider a case where participant 12 is speaking for an extended period, then participant 13 interjects and speaks for an extended period, such that participants 12 and 13 are briefly speaking at the same time before participant 12 is cut off. In this case, participant 12 preferably will be the dominant speaker before the overlap interval, and participant 13 will be the dominant speaker after the overlap interval, regardless of who wins the conflict. In other words, in this situation the conflict-resolution rules preferably will only decide who wins the overlap segment.

The preferred result is a set of dominant-speaking segments for each participant, indicating when that participant has been determined to be the dominant speaker, with exactly one participant considered the dominant speaker at each point in time. Once again, it should be understood that the specific embodiments described herein (and in particular all of the specific rules described herein), while currently preferred, are merely exemplary and may be modified and/or supplemented in alternate embodiments. In certain alternate embodiments, for example, multiple speakers can be highlighted at any given time; in these embodiments, the process preferably is modified to identify all of the dominant speakers (subject in some such embodiments to a maximum number that is desired to be highlighted) at each point in time.

In step 227, the final cut determinations are made. That is, a determination is made as to which individual speaker (or speakers, in alternate embodiments) will be highlighted (or featured) at each point in time in the final composited video 130. Although it is possible to just highlight the dominant speaker at each point in time, the result generally would not be very aesthetically pleasing. For example, when broadcasting a live conversation or interview, it is impossible to make instantaneous cuts to new speakers; there is always a delay before the director realizes that a new person will be speaking for an extended period of time, and commands a cut to the camera focused on that speaker. Indeed, the present inventors have discovered that instantaneous cuts appear unnatural to most viewers.

To account for this consideration, in certain embodiments the auto-editing tool 120 adds artificial delays to cuts (i.e., changes in the speaker(s), if any, that are being highlighted or emphasized), such that the emphasis or focus ordinarily does not shift to the participant who is currently speaking until sometime (e.g., approximately 0.5-2.5 seconds) after that participant starts talking In more specific embodiments, the length of the delay is dependent on the total length of the speech segment. If the speech segment is short (but still longer than the specified minimum length), the cut preferably happens quickly; otherwise, most of what the speaker says would be missed. If the speech segment is longer, a longer delay can be added. A small degree of randomness (e.g., with a uniform, truncated Gaussian or truncated Poisson distribution within an interval whose duration is a fixed percentage of the nominal delay for the cut) also can be added to the nominal delay length (e.g., a true random amount or a pseudorandom number amount between −0.5 and +0.5 second) to increase the sense of realism. In addition, the amount of such randomness preferably can be dependent upon the kind of content (e.g., a talk-show type interview as compared to a panel discussion), e.g., as designated by the user. In the preferred embodiments, cut delay is provided but can be disabled by the user (e.g., host 11) and is optional.

Also, in certain embodiments, if a participant is chosen by the auto-editor 120 to be the dominant speaker for an extended period, one or more cuts periodically are made to another participant for a reaction shot, so as to provide some visual variation. In this case, the participant to cut to for a reaction shot preferably is selected either as the next participant to be the dominant speaker, or another participant who has not been the dominant speaker for a while. In order to increase the likelihood of obtaining a good reaction shot, it is also possible to use facial-recognition detection and thereby only consider participants who appear to be active listeners. Facial recognition routines are available in libraries such as OpenCV™ (Open Source Computer Vision).

Module 168 can incorporate additional auto-editing rules as well. For example, there might be no one speaking at the start of synchronized audiovisual stream, or the host 11 might not be the first person to speak. The results of the assessment of significant sound levels provided by modules 160 can be optionally used to trim off leading quiet segments so that opening remarks start right from the beginning (or near the beginning) of the finished show 36. In a similar manner, if significant content ends well before the recorded show itself has been brought to a close (which also is when the locally saved files are closed), then the excess can be identified and trimmed off.

If speaking from someone other than the host 11 is first detected in module 168 and such speech is for a short duration (e.g., less than a specified time threshold), or if there is a gap with no significant detected sound after such speech, especially if the host 11 speaks strongly even for a short period (e.g., approximately 1 second) or if the host 11 speaks for an extended period (e.g., 2 seconds or more), such speech from one of the additional participants 12-14 preferably is disregarded by trimming the beginning of the composited audio-visual stream to the point at which the host 11 has been detected as first speaking. Otherwise, if such speech from one of the additional participants 12-14 occurs but is not excluded as discussed in the preceding sentence, then it preferably is included in the finished show 36.

Referring back to FIG. 5, upon completion of step 168 the auto-editing tool 120 begins synthesis step 169, in which it uses the additional information 127 (specified by host 11), any information provided by other sources (e.g., information from a centralized database, portal or remote data store that is not subject to editing by host 11, although some or all of it potentially could be dependent upon selections made by host 11), and the generated cut instructions to control the size and placement of each of the original video streams 114 into the composited video stream at every point in time. For example, additional information 127 preferably includes a template setting that specifies the size and position of the highlighted participant, and typically is used for the speaker who has been identified in the preceding processing as having the dominant speaking role at the current time.

The output of step 169 is the set of editing instructions 124, in a video-editing XML document that specifies, in the current embodiment, the size, position, highlighted participant segments, video properties, and audio settings for each video, e.g., with respect to each change in the highlighted participant. More preferably, each original video stream preferably is put into its own video track, and these video tracks are directed to different windows within the output video frame on a changing basis in accordance with the editing instructions 124, with each such window potentially having a fixed z-ordering (or z-depth or layering order). In the preferred embodiments, the names of all the participants, or at least the name of the current or highlighted speakers, are added as a text layer over the corresponding video, e.g., either continuously or at interesting points in the conversation (e.g., at the beginning of the show and/or the first time each participant speaks, and/or is highlighted as a featured speaker, during the show). Nicknames and/or geographic locations ("Los Angeles", "Tripoli", etc.) also can be used to caption participants. Still further, a progression of different captions can be used per participant (name, followed by location, followed by position, etc.). Captions can be transitioned in. A crawl can caption each participant. The completed show 36 itself can have a caption or title; and the display of such a caption can employ any of the options described herein for the participant captions. The frame image preferably is composited atop the videos, and a background animation or video (e.g., looping repeatedly for the duration of the sequence) or (currently less preferably) a background image can be composited below the videos. Additional artwork layers may have been specified in the show information 127 and added here. A logo layer makes it possible for a logo that is appropriate to the originator 45 or its client to be displayed in the completed show 36. Sponsor layers can include static graphics, motion video, static and/or motion text to convey sponsor information; in certain cases, the background is a sponsor layer. Informative crawls, watermarks, and other visual elements may also be used to convey information, branding, and outreach to generate additional and/or related interest.

Referring back to FIG. 4, once the editing instructions 124 have been generated, they are provided to cutter 122, which uses them, together with the previously uploaded video files 114, to generate the output composited video 130. The editing instructions 124 preferably are first created in an intermediate format (e.g., the output of module 168 is in the intermediate format) and then are translated (e.g., in module 169) into an XML file (or other format) that the cutter 122, such as Final Cut Pro™, can follow. This approach allows for easier adaptability for use with substitute cutters 122.

The cutter's native captioning and titling features can be either utilized by module 169 or disregarded, in any desired combination. However, for uniformity of the finished show 36 and, secondarily for uniformity of synthesis, static caption and title information preferably is created with user-specified fonts (e.g., specified by host 11) as a graphical image that allows for direct incorporation as its own layer during cutting, making caption/title creation independent of the selection of cutter 122. Dynamic caption or title information preferably also can be specified by the host 11, again introduced in a cutter-independent format. Introductory information or material (intro) and concluding information or material (outro) preferably also may be specified by the host 11 and then referenced for use during the cutting process. Similarly, transitions between the intro and show content, and between show content and the outro preferably may be specified and then referenced for use during the cutting process. Still further, intros and/or outros can be generated automatically based on other information provided by the host 11, e.g., by automatically generating credits in which a pre-stored photograph or an automatically selected frame from the submitted video and the name entered by the host 11 are displayed together for each of the participants 11-14. In any event, the intros and/or outros can include any combination of content, such as conversation-related content, music, branding and commercials.

Upon completion, the finished show 36, output from the cutter 122, preferably is transcoded (e.g., using a transcoding application) into the desired format(s) and saved to a location where it can be displayed, viewed, shared or presented. Multiple renders and/or other kinds of output formats can be generated to accommodate different display devices with different encoding and/or resolution requirements. In addition, different versions can be produced in order to provide the final composited video program 36 at different levels of quality. The completed show 36 (potentially multiple different versions) then can be transferred directly to device 38 or stored in a location that is accessible (using the appropriate login credentials), and/or where its use and distribution may be controlled, by administrator 41. In this latter case, administrator 41 preferably has the ability to provide feedback and/or instructions 39, e.g., requesting changes to the finished show 36 or directing how and under what conditions it is to be used or made available.

It is noted that sometimes errors are made when making selections, or aesthetic changes are desired. The auto-editor 120 preferably is designed to work with a set of data to which it can react. For example, if a spelling change is made in a caption, if a style selection is overridden, if a background is changed, if an intro is altered, if a logo is modified, if a sponsor wants to influence change, if edit suggestions have been made (e.g., start at a different point in the composited audiovisual stream, cut out a tangential conversation from here to there, etc.), the auto-editor 120 preferably can be run again with the original audiovisual streams and corresponding modified inputs, in order to produce the new, desired result.

For this purpose, an additional user interface preferably is provided for modifying originally specified information such as, but not limited to, spelling changes for captions, style selection, background selection, intro selection, outro selection and/or logo selection. Entering such changes and then clicking on an appropriate user interface element preferably causes the auto-editor 122 be run again, and the resulting output program 36 will reflect the changed selections. This alternate user interface, e.g., can be either a part of the host's version of the participant application 80 or a web-related page that presents current settings and accepts modified settings.

Additionally, when the cutter 122 provides its own graphical user interface, the project created by the auto-editor 120 can be loaded for further adjustment, rather than just for completion (e.g., rendering) of the finished show 36. For example, an operator of the cutter 122 may make changes manually, to the extent the cutter 122 allows. Because the auto-editor 120 preferably generates its results in its own internal intermediate format, the same show can be set up for completion with a cutter 122 that has no graphical user interface and with another cutter 122 that does. In the preferred embodiments, a cutter 122 without a graphical user interface normally is used because it is faster and easier to automate. However, should manual adjustments be desired, the internal intermediate format preferably is translated into instructions to be consumed by a different cutter 122 that does have a graphical user interface, e.g., thereby making it possible to make manual adjustments to the cutting timeline when required.

Still further, an annotator (web-accessible or downloadable local application) that a minimally trained reviewer can use to mark locations in a version (e.g., rendered version) of the video where editing adjustments should take place can be provided. Rather than functioning as a full-blown video editing system with separate tracks for each participant and content asset, such an annotator presents the program so that the reviewer can: choose start and stop points for removals of unwanted audiovisual segments; move the start and end points of the program so as to cut off material at the start or finish; selectively choose where audio but not video, or video but not audio should be modified (e.g., blanked, substituted with other material such as a tone or test pattern, a flash, or other pre-set option); selectively choose where alternate content not available at the time of original production is made part of the next production, including a split of the original program and insertion of the new material; selection of transitions, either different or additional (such as into or out of newly introduced media); and the like. Instructions so provided preferably are then passed to the auto-editor 120 where they are acted upon in order to generate a new version of the program. Newly introduced content preferably is uploaded, or referenced if previously uploaded, for use in the next edit and production cycle. The reviewer who is annotating might need help with knife-edge cutting, something that might be difficult while using a less featured manual editing environment and/or when dealing with compressed content. The audiovisual content optionally can be compromised for this purpose and perhaps be of low quality to hasten the speed of download and to provide the reviewer with less than pristine material as a limited distribution inducement, or playback might be made through Flash™; in either such case, it ordinarily would be difficult to stop on a frame or specify editing instructions down to a frame. Accordingly, in such cases the preferred annotator inputs an indication of where a cut is to occur, then looks for a nearby location where a cut can be made between words (or sounds). A proof edit and production optionally is performed on the reviewer's computer, or remotely with upload of the annotation file. Once approved, a regular production is performed using the newly provided information. It is noted that a production provided for annotation purposes can be supplemented to include an obscuring stripe or other indication of it being a work in progress and not for distribution.

It often adds value to include a client's or sponsor's logo in the finished show 36. A style selection preferably can place restrictions on the size and placement of a logo. Then, just as the auto-editor 120 can make cutter-independent title images, it preferably also can accept logo artwork and resize and relocate it so it may be used as a layer in the program.

The result of the foregoing process can be a single, fully edited, professional-quality video in the desired video format, ready to be viewed, shared, or presented. Generally, when implemented entirely automatically the entire process can be performed much faster than if done manually, e.g., in a number of minutes as compared to several hours.

In addition, a variety of other kinds of automated processing also can be included. For example, an audiovisual program sometimes includes uncomfortable pauses due to communication latencies, such as can be experienced when speaking through a VOIP or overseas satellite connection. As an option, these pauses can be reduced or eliminated during the editing and cutting processes for a more fluid and natural presentation. In this regard, latencies between when participants speak can be measured throughout the real-time conversation or estimated throughout the resulting composited audiovisual and recorded in an accompanying data file. When a participant to replies with delay due to such latencies, the reply can be advanced during the cutting process by the latency amount then being experienced. In such a case, synchronization can be maintained in one of several ways: jump cut, cut with transition, increase playback speed to make up time during the listening period, or introduce an image breakup during the listening period that comes across as a communications error but actually is a simulated communications breakup used as an opportunity to advance through the audiovisual stream. Timing adjustments for the playback of other participants' audiovisual streams similarly can be made while maintaining synchronization.

Also, a participant might not sit squarely in the center of the camera view; or a participant might have a wide aspect ratio camera when the completed show 36 has been selected to be made with a traditional aspect ratio image for each participant video. In such cases, face recognition can be performed to identify the location of the largest face in the view, or the face that shows movement when voice is detected, and confirm that it remains approximately centered after cropping, or to take a subset of the participant's video for use during the production to keep the participant approximately centered in his/her window.

Additional functionality of, and considerations pertaining to, system 10 are now discussed in connection with the exemplary uses of the system 10 described below.

Use of the System—Multi-Participant Show Creation.

The following discussion concerns examples of using system 10 to create a composited audiovisual show. For the most part, the following discussion focuses on the participants' actions and, for simplicity, assumes they are all interacting with the participant application 80, for which the host functionality is only enabled on the host's device 21 (although it should be understood that such host functionality instead may be provided in a separate application, that device 21 can be replaced with a host facility that includes multiple devices for providing the host functionality, and that similar variations are available for the other participants 12-14).

Figure 8:
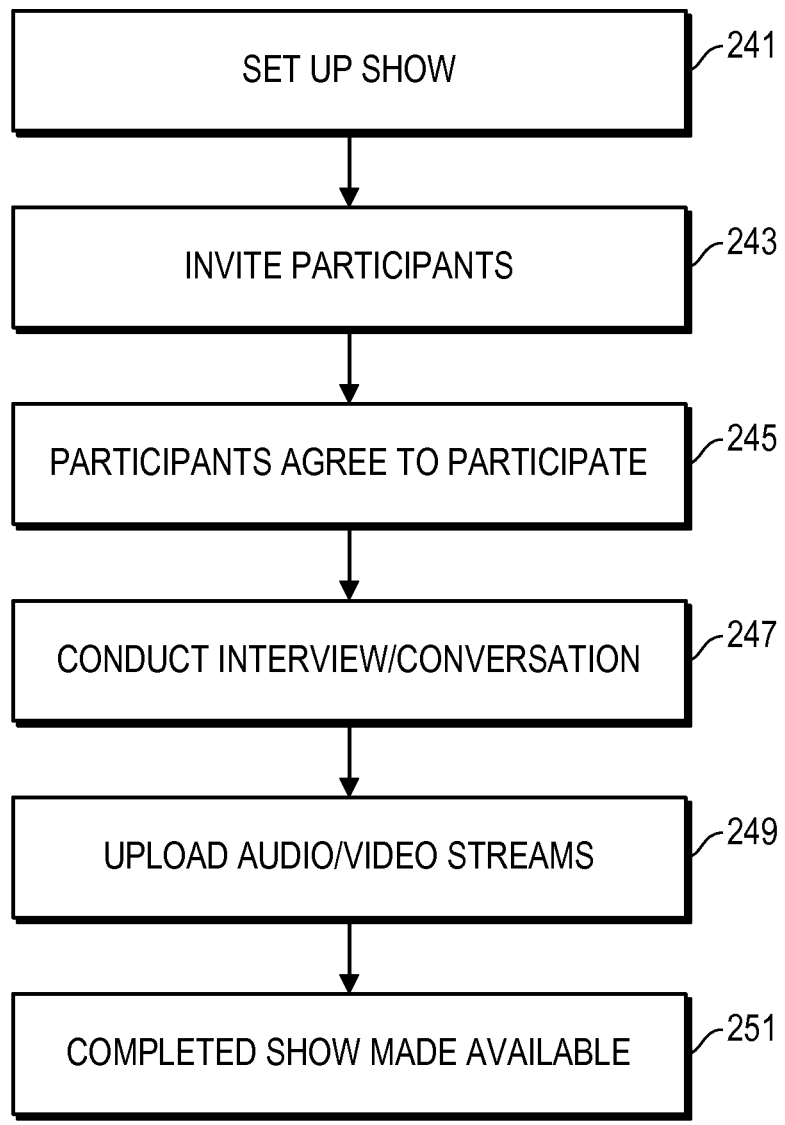
FIG. 8 is a flow diagram illustrating the creation of a composited video program according to a representative embodiment of the present invention.

Initially, each of the participants 11-14 preferably logs into the system 10 through the participant application 80, using the participant's user name and password credentials. Once logged in, a participant preferably can (among other things) check or edit his or her contact list (identifying other individuals who use the system 10 and who previously have been added by the participant) and see who is currently online. In addition, the host preferably can initiate the processes for the creation of a show, e.g., by running a Start My Show Wizard. Upon doing so, the following sequence of events preferably occurs, with reference to FIG. 8.

Initially, in step 241 information 127 to produce the composited video program 36 is input by the host 11 into the participant application 80 running on the host's device 21. More preferably, an overall template for the final video is constructed. Included in the template design choices are, e.g., any or all of:

- the show title—e.g., what ultimately will be displayed in the title bar at the bottom of the show;
- any additional title—preferably not displayed within the show, but is seen below the show poster frame when the finished show in on a selected portal website;
- participant selections—preferably allows the host 11 to invite additional participants 12-14 by simply clicking checkboxes in the host's contact list; in addition, it may allow importing of additional information regarding the participants, such as their names, nicknames, titles, geographic locations and/or photographs (e.g., if not already present in the contact list);
- show length—allows the host 11 to select the length of the show, e.g., from a drop-down menu with choices of 3, 5, or 10 minutes, any longer durations, or "manual stop", meaning that the show only concludes upon manual designation of the host 11; in certain embodiments, the real-time conversation can end prior to the set length at the command of the host 11 and/or the specified show length can be a hard cut-off or may only trigger an advisory that time is running out, e.g., depending on profile information and what is authorized for this host 11 and/or the originator 45;
- the display background—the design that is to be visible behind the individual video windows, which, e.g., could be a static image, a static graphic pattern, animated graphics or recorded video;
- the show handle—e.g., used as an identifier to help keep track of shows as the originator 45 builds up large databases of shows; preferably not displayed on the screen, but rather just stored as metadata in association with the finished show 36;
- any pre-show comments—e.g., used to make notes about a show for reference later; the host 11 preferably can amend this field after a show is recorded;
- a portal selection—designates where the finished show 36 will be delivered or who will have access to it; in some cases, only the administrator 41 will be able to set this field, not the individual hosts 11;
- the display frame—the border, if any is specified, for the overall video display, which could be as simple as a single-line rectangle or can be omitted entirely;
- the frame set to use—the sizes and positions of the video windows to be used and, in certain embodiments, whether those video windows that remain static or whether and how they are to move during the course of the final composited video;
- the manner in which individual windows are to be highlighted or emphasized this, e.g., using a fixed highlight window, as in the example above, or dynamically changing the characteristics of the displayed windows in order to highlight individual ones of them;
- whether or not, or the circumstances under which, non-highlighted participants are included in the display at all;
- any textual display items such as identifiers for the participants, rolling textual banners and, e.g., in embodiments where manual transcription, automated word spotting or automated speech recognition is performed, subtitles and/or translations of the spoken words, together with characteristics for such textual items (e.g., color, font and size);
- any definition of space that is allocated for other purposes, e.g., for video of a computer screen capture or for a video feed (e.g., concerning something or someone other than a participant) during the live conversation; such space can be used, e.g., for displaying related pre-recorded video (e.g., clips from a movie where the conversation concerns a review of the movie), slideshows (e.g., where the conversation is in the nature of a panel discussion), whiteboarding (e.g., where the conversation is in the nature of a business meeting), slides from a PowerPoint presentation, pages from a PDF, spreadsheet pages, zoomed in areas of any of the foregoing, or similar content;
- any definition of space that is to be allocated to content to be added after the live conversation, such as supplemental material or advertising;
- information regarding the intro and/or outro, e.g., including how they are to be constructed based on provided information and/or actual audiovisual recordings that can be used in them;
- additional style elements—preferably allows selection from among a variety of graphic design elements such as background color and patterns, title bar, and logos;
- colors or themes pertaining to any of the foregoing; and/or the date and time that the real-time conversation is to take place or an indication that it is to take place immediately;
- the actions to take after the auto-editing tool 120 has completed, but prior to application of the cutter 122;
- the actions to take after the auto-editing tool 120 and the cutter 122 have finished creating the composited video.

In certain embodiments, most of the foregoing settings are chosen automatically, e.g., based on the nature of the show that is being created (e.g., as designated by the host 11) and/or the host's profile, but the host 11 is given the opportunity to change or confirm such default settings through a graphical user interface.

Next, upon completion of step 241, in step 243 invitations are sent by the participant application 80 running on the host's device 21 to the participant applications 80 of the desired additional participants that were selected by the host 11 in step 241.

In step 245, those desired participants input responses into user interfaces provided by their participant applications 80 (e.g., by simply clicking on "yes" or "no"), which in turn ultimately forward such responses to the participant application 80 running on the host's device 21. The invited participants who accept the invitations are then considered to be the actual additional participants 12-14.

Figure 9:
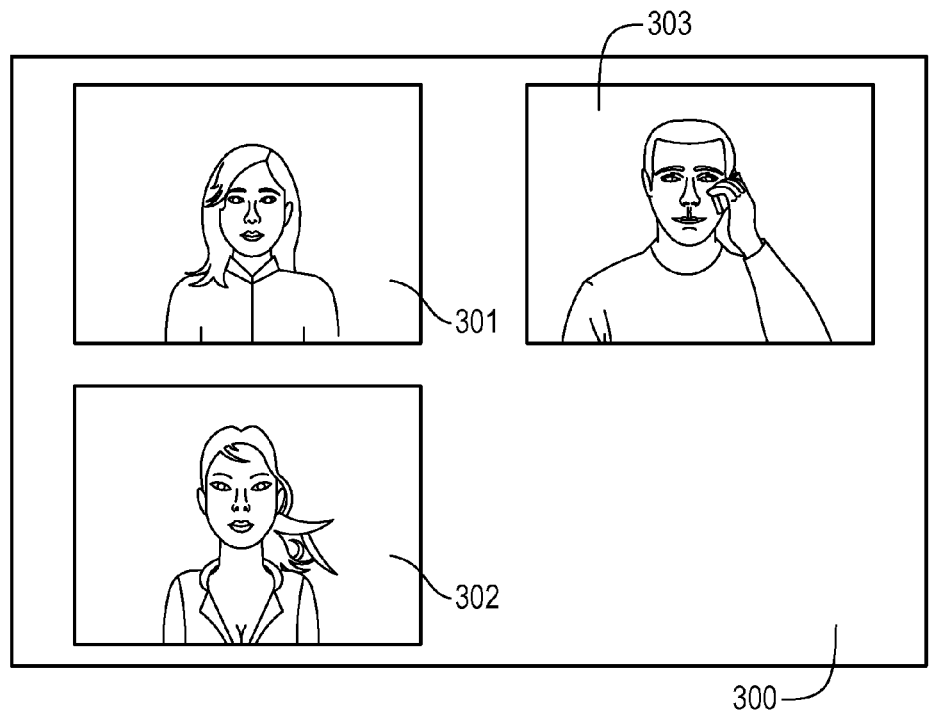
FIG. 9 illustrates a video window layout for a pre-show conference according to a representative embodiment of the present invention.

In step 247, the real-time conversation is conducted, e.g., through the participant applications 80 running on the corresponding devices of the participants 11-14. Preferably, a pre-show video conference, in which the participants 11-14 can see and hear each other but the recording of the data streams for uploading to the production server 35 is not yet begun. Such a pre-show video conference provides an opportunity for the participants 11-14 to greet each other, discuss the show, and make sure everyone looks and sounds their best. An example of a video window layout 300 for a pre-show conference, including live video streams 301, 302 and 303 from three corresponding participants 11-13, is illustrated in FIG. 9. Typically, such a display would include other information, which is omitted here for simplicity.

The host 11 then clicks on a user interface element to start the recording, causing a signal to be sent to the participant application 80 on each of the other participants' devices. A visual countdown lets everyone know when the recording begins, and from that point forward the show is recorded on each of the participant's devices; that is, at each participant's device an audiovisual (or audio-only) record of that participant's involvement is made. Upon expiration of the time duration specified by the host 11 in step 241 (subject to any extensions designated by the host 11 during the course of the live conversation), the show is deemed finished, and recording stops on all the participants' devices.

In step 249, each participant's recorded audiovisual (or audio-only) file is automatically uploaded to the production server 35 for editing and distribution, as described above.

In step 251, the completed show 36 is downloaded or otherwise made available to the administrator 41, also as described above.

Figure 10:
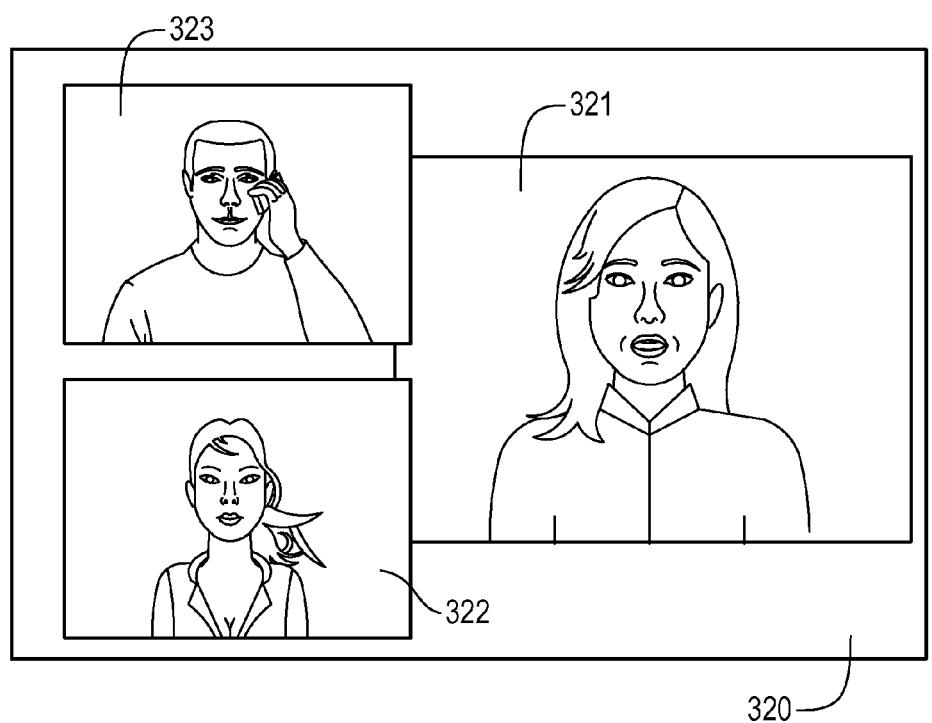
FIG. 10 illustrates a first example of video window layout in a finished show according to a representative embodiment of the present invention.

Keeping with the example described above and illustrated in FIG. 9, one example of a frame from the resulting composited audiovisual program 36 is illustrated in FIG. 10. In this example, three participants 11-13 are participating in the conversation, and three separate windows are provided within the frame to contain the corresponding video streams 321, 322 and 323, with the rightmost window (corresponding to stream 321 for host 11) being the largest and the other two windows having the same, smaller size. As described above, the auto-editing tool 120 has automatically identified host 11 as the current (or primary) speaker and, therefore, placed her video into the main window.

Figure 11:
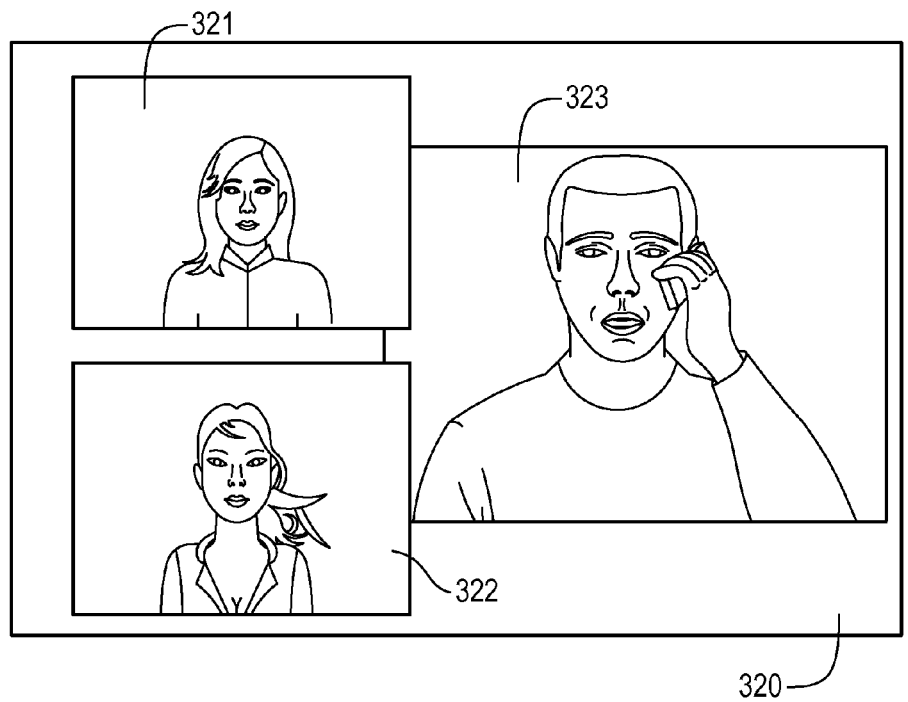
FIG. 11 illustrates a second example of video window layout in a finished show according to a representative embodiment of the present invention.

Later during the conversation, the auto-editing tool 120 automatically detects that a different participant 13 has begun speaking and, in response, the auto-editing tool 120 automatically puts the audiovisual stream for participant 13 into the larger, rightmost, main window, essentially swapping the videos for the two windows, with the result illustrated in FIG. 11.

Figure 12:
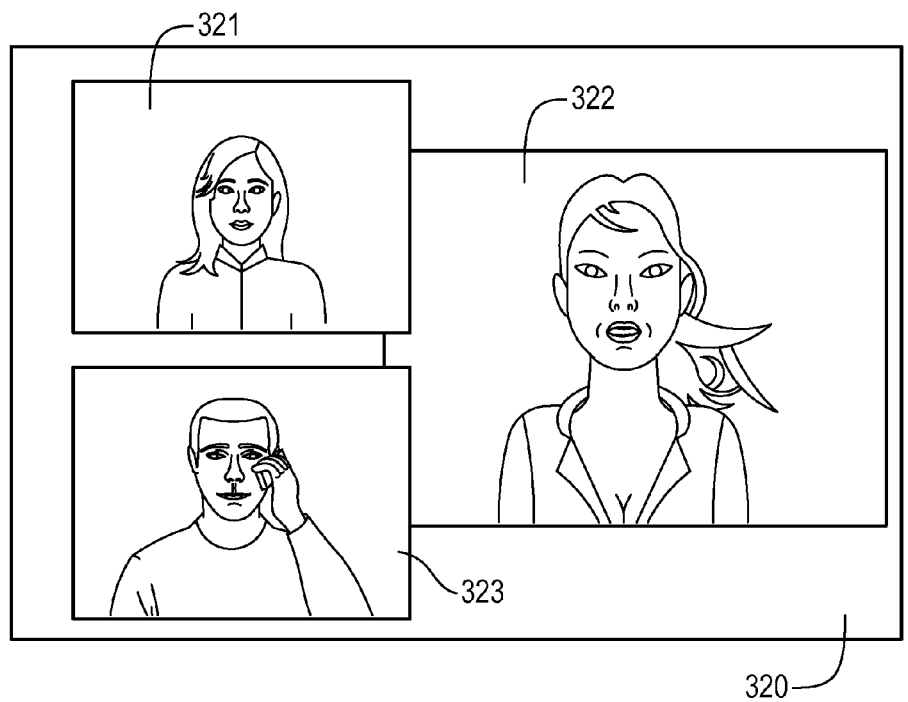
FIG. 12 illustrates a third example of video window layout in a finished show according to a representative embodiment of the present invention.

Next, when participant 12 becomes the primary speaker, the auto-editing tool 120 swaps her video stream 322 when video stream 323, so that participant 12 now appears in the main window, as shown in FIG. 12. Typically, such changes will occur throughout the entire show 36.

Figure 13:
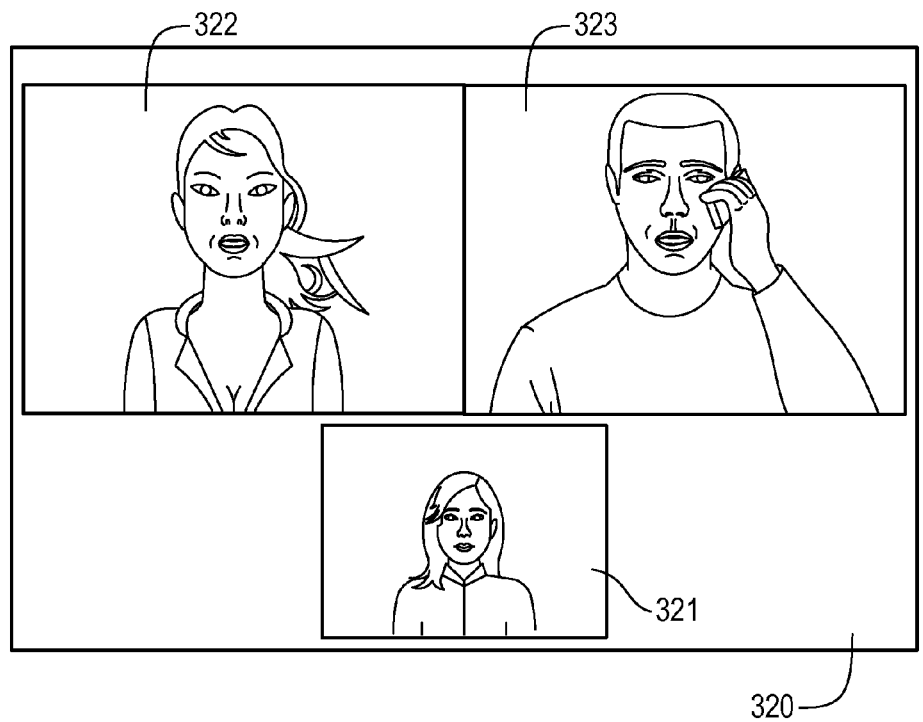
FIG. 13 illustrates a fourth example of video window layout in a finished show according to a representative embodiment of the present invention.

In certain alternate embodiments, the auto-editor 120 is configured to highlight two different participants at the same time under certain circumstances, such as a detection that the two are engaged in a heated verbal exchange. An example of such a video window layout is shown in FIG. 13.

Also, in the foregoing example, the videos for all of the participants always are in frame, but the auto-editing tool automatically highlights one of the participants by putting the video for that participant into the larger and/or otherwise more visually prominent window (e.g., closer toward the middle of the frame). Ordinarily, the highlighted participant will be the one that currently is the main speaker. However, as discussed in more detail above, the auto-editing tool preferably sometimes highlights other participants, e.g., to provide a certain amount of variety and/or to highlight one of the other participants' reactions.

It should be noted that variations on the above-mentioned criteria are possible. For example, in certain embodiments, at least under certain circumstances, the system cuts away entirely from one or more individuals who are not currently speaking (so that they are not displayed at all for a period of time), in order to more fully emphasize the current speaker(s). Also, in situations where the production server 35 does not have access to a video for one of the participants (e.g., participant 13), it can display a pre-stored static or moving image or graphic symbol in the window corresponding to such participant.

Still further, the discussion above generally concerns embodiments in which cut decisions are based on audio analysis. In addition, or instead, such decisions can be based on any of a variety of different factors, including video analysis (e.g., such as expression analysis, facial analysis, motion analysis and/or simple comparisons of relative motion in the different video streams), monitored communications (e.g., instant messaging) occurring during the real-time conversation and/or submissions of reference materials during the real-time conversation.

In this latter regard, in certain embodiments of the invention the participant application 80 allows individual participants 11-14 (e.g., under the control of host 11) to submit prerecorded audiovisual segments (which, in the preferred embodiments, can be played once, replayed upon manual designation or automatically looped), documents, separate live video feeds or any other kinds of materials for the other participants to see and/or hear during the real-time conversation. Upon doing so, a separate video window preferably is opened during the real-time conversation and a separate audiovisual (or audio-only or video-only) stream is created and treated in a similar manner as if a new participant joined the conversation for a limited period of time (e.g., as discussed elsewhere herein), e.g., with one real-time data stream being transmitted and a second data stream being sent to the production server 35.

Additional Multi-Participant Show Features.

In general, the auto-editing tool according to the foregoing embodiments of the present invention provides highlighting or participant emphasis that follows the conversation, highlighting individual participants in a way that will seem intuitive and natural to most viewers. In the specific embodiment described above, multiple individuals (three in the specific example described above) are shown within the frame at all times.

According to alternate embodiments of the present invention, the number of people shown within the frame varies over time. Thus, in certain more specific embodiments, three set-ups are used in order to service the foregoing goal: a single (in which only one participant is shown within the frame), a two shot (in which exactly two participants are shown within the frame) and a group shop (in which more than two participants are shown within the frame). These set-ups preferably are used as follows. When one person is talking, a single is used, with that single person highlighted (i.e., occupying the entire frame in the present embodiments). When two people are talking, a two shot is used, in which both people are highlighted (i.e., only those two are shown within the frame in the present embodiments). When more than two people are talking concurrently, the group shot is used, in which all of the participants, or only those who currently are speaking, are highlighted (meaning, in the present embodiments, that they are the only ones in frame at that point). When the auto-editing tool transitions from one set-up to another, the video preferably always cuts a little bit after the speaker changes. The amount of time for the delay to the video transition preferably is selected at least partially randomly from the continuous interval between 0.2 and 2 seconds. The shorter the speech segment, the longer the delay preferably is to the next set-up and the longer the speech segment, the shorter the delay preferably as to the next set-up.

In this embodiment, the two shot can result from two different scenarios. One would be while two people are talking at the same time, and the other would be when just two participants are involved in a dialogue for an extended period of time (e.g., more than 20-30 seconds).

In the present embodiment, the foregoing rules apply during normal conversation. However, different rules preferably apply during special circumstances. Preferably, a special circumstance exists for what otherwise would be a long duration single (e.g., longer than 15-25 seconds). In this case, cutaway logic preferably is applied, i.e., inserting one or more cutaways. In this regard, a cutaway is intended to mean a relatively short duration (e.g., between 2 and 4 seconds) in which one or more participants other than the speaker are highlighted instead of the speaker. The number of cutaways preferably is determined by the length of the special circumstance. 16-24 seconds of special circumstances preferably result in one cutaway, 24-32 seconds preferably result in two cutaways, and then another cutaway preferably is added for every additional 8-16 seconds.

If a special circumstance results in only one cutaway, that cutaway preferably is the next person who is going to speak. If two cutaways are to be used, the first cutaway preferably is to the last person who spoke, and the second cutaway preferably is to the next person who is going to speak. If more than two cutaways are to be used, then the first cutaway preferably is to the last person who spoke, the last cutaway preferably is to the next person who is going to speak, and the rest in between can be chosen randomly or based on specified indicia (e.g., audio and/or visual activity for the participant indicating that the participant is exhibiting a strong reaction to what is being said).

A variation can be to go to a two shot with the person who is speaking and the cutaway choice or to go to the group shot. A long two shot as determined by the two shot parameters stated above preferably complies with the cutaway logic, using the participant(s) who are not involved in the two shot and the group shot for the cutaway(s). If only one cutaway is to be used during a two shot, it is preferable to use the group shot. If two or more cutaways are to be used during the two shot, the cutaway preferably is to one or more of the participant(s) not involved in the two shot, e.g., alternating between going back to the two shot and cutting between the participants involved in the two shot.

During periods of silence, the emphasis preferably is on the group shot, and any cutaways from a long group shot can be completely random regardless of whether everybody is talking or all are silent. A variation in group shot cutaways is to go to two or three singles before going back to the group shot.

Generally speaking, any participant sound that is less than a second in duration preferably is simply ignored. However, any such sounds that can be recognized as (or soon to be) the participant's voice, particularly if there are multiple such sounds, at least sometimes can be interpreted as an attempt by that participant to break into the conversation and, therefore, can be used as a basis for cutting away to that participant in situations where a cutaway is desired.

In the embodiments described above, it is generally assumed that the video windows within the overall composited video frame are static and that participant-highlighting transitions occur by moving the video streams among those windows, i.e., by moving the video stream for the participant to be highlighted to the larger or more prominent window. However, in alternate embodiments the video windows change positions in the composited video frame, e.g., with the participants' positions in the frame remaining relatively constant but with the window for the currently highlighted participant being enlarged (and potentially being moved somewhat toward a more central position in the displayed frame) at the time of the transition. Moreover, it is noted that such an enlargement (and movement, if used) need not occur abruptly, but instead can occur over a short period of time (e.g., 1-2 seconds), e.g., with the previously highlighted participant's window becoming smaller and moving out of the way as the window for the next participant to be highlighted growing larger and moving toward the central frame position. More generally, the user preferably has the ability to specify in the design template the way in which such transitions are to occur, from a variety of different pre-specified options.

Also, the foregoing discussion concerns a situation in which multiple participants are involved in a single conversation. However, it should be noted that this situation might occur for only a portion of the final composited video. In one such example, the host of a show is alone in the frame for a period of time, then one or more guests join him/her for the rest of the show or selected segments of it, potentially with new guests entering and previous guests leaving over time. Thus, the techniques described above ordinarily only would be applied for those segments when multiple participants are involved. More generally, participants may be added and/or dropped during the real-time conversation, changing which participants are to be included in the edit and perhaps the overall number of participants to be included in the completed show 36 as the edit proceeds. These changes preferably are accommodated by keeping track of the number and identity of participants, and by using appropriate layouts within a style family for the number and type of participants that are to be presented at every moment.

The foregoing embodiments primarily concern situations where all of the video streams to be incorporated into the composited video frame are of individual people. However, the present invention is intended to be quite flexible, meaning that other kinds of video streams also may be incorporated into some or all of the final composited show. Examples include news video, computer-screen-capture video or the like.

In certain embodiments of the invention, automated word spotting (i.e., automatically identifying spoken words from a relatively small set), automated speech recognition (i.e., automatically identifying spoken words from a large, typically substantially complete, dictionary of possible words) or manual transcription is used for the purpose of creating a preferably time-stamped transcript of each audio track in the composited video. To the extent automated processes are used, the resulting text optionally can be supplemented with metadata regarding the process's confidence in its recognition accuracy (e.g., so that words that have been recognized with higher expected accuracy can be given more weight in subsequent searching). In any event, the resulting text can be indexed and used for searching (e.g., for a subsequent consumers to find a particular segment that relates to a particular topic) and/or to trigger appropriate advertising (e.g., either in the composited video itself or to be displayed in conjunction with the composited video).

The auto-editing tool of the present invention can be used to easily generate entirely new professionally edited content from what otherwise could be just an informal conversation, where the participants do not even have to be in the same location. In addition, it can be used to generate value-added content from existing interactions, such as radio call-in shows (e.g., with a video camera on the radio show host and with at least some of the callers having the teleconferencing/recording participant application discussed above). It can be used to easily create interview shows, instructional content (e.g., panel discussions), game shows, and any other imaginable content where multiple participants are to be involved.

Wherever a still image has been mentioned above, a video clip can be substituted. For example, a frame around a window can be a fixed image or it instead can have a sparkly, wobbly or pulsating emphasis. Similarly, any logo can be a fixed image or it can include a video clip (that includes motion) and/or a render from 3D with motion and/or changing light sources.

Finally, because the composited video preferably is entirely digital, any portions of the display can be made to function as an active link to a website or to download other content.

Additional Features Pertaining to Styles.

Figure 14:
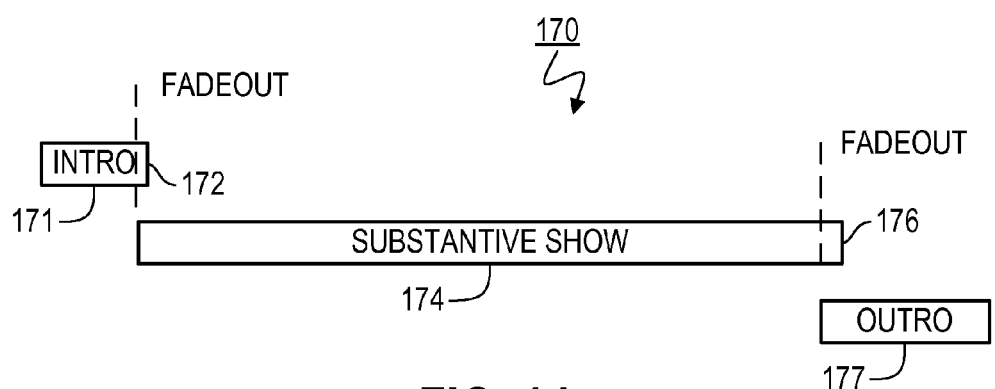
FIG. 14 illustrates a timeline, showing the relationships between an intro, a substantive show, and an outro according to one representative style.
Figure 15:
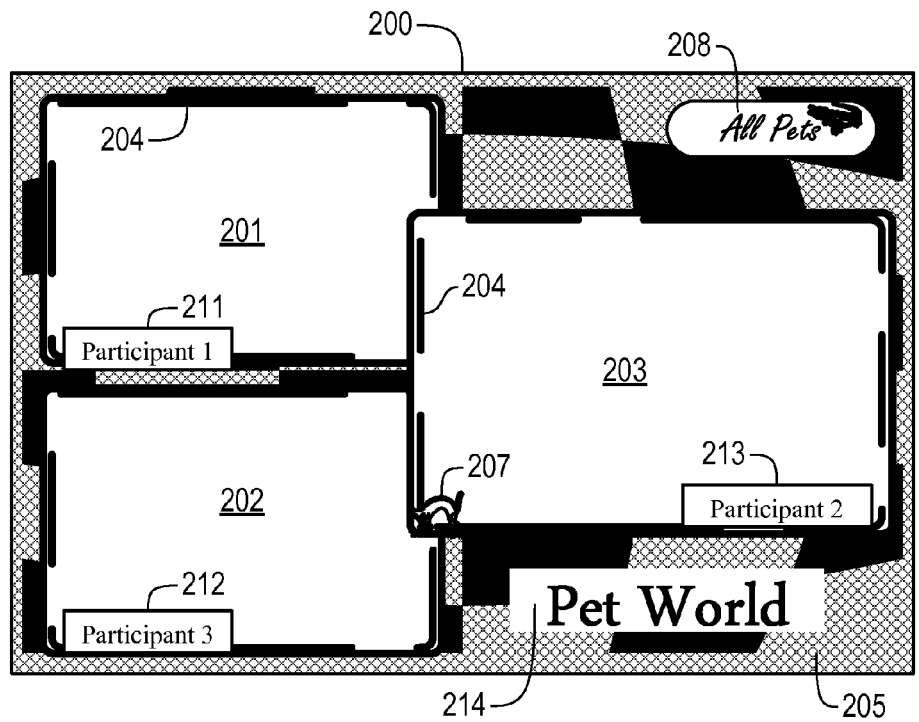
FIG. 15 illustrates an example of a video window that includes various design elements making up a style.

As noted above, a set of design elements (each typically stored as a separate computer file), often having been selected and arranged so as to achieve a desired aesthetic impact, is referred to herein as a "style". FIG. 14 illustrates a timeline 170, showing certain temporal aspects of a show according to one representative style. FIG. 15 illustrates an example of a video window 200 that includes various design elements making up a style. Although video window 200 illustrates a multi-participant show, identical design elements (other than the specific frame design that is illustrated) can be provided for a single-participant show as well. References to elements shown in FIGS. 14 and 15 in the following discussion should be understood as just examples of the particular design elements being described.

In the various embodiments of the invention, a style can include, e.g., any or all of the following elements:

- An intro 171, typically a video element (e.g., live motion, animation, moving or changing text, music or other audio, or any combination of these elements) having a duration of 3-30 seconds, at the beginning of a show, potentially overlapping 172 part of the beginning of the substantive portion 174 of the show.
- An outro 177, typically a video element having a duration of 5 seconds to several minutes, at the end of a show, potentially overlapping 176 part of the end of the substantive portion 174 of the show.
- One or more transition clips, which can be a video element (with or without audio) or just audio, and can serve as a bridge, e.g., between: the intro 171 and the beginning of the substantive portion 174 of the show, the end of the substantive portion 74 of the show and the outro 177, and/or different portions or segments of the substantive portion 174 of the show.
- A frame design, generally including one or more video frames 201-203, their sizes and shapes, the way in which they are arranged on the screen and in relation to each other, how that arrangement changes when a particular frame is to be emphasized, and the appearance of their borders 204. In the example shown in FIG. 15, three frames 201-203 are arranged with the unemphasized frames 201 and 202 vertically aligned on the left side of the video window 200 and with the emphasized frame 203 being located on the right side of the video window 200, being enlarged compared to frames 201 and 202 and partially overlaying the right edges of frames 201 and 202.
- A background 205, either static or moving, that lies behind the frame(s) 201-203. In the preferred embodiments, the background 205 is defined as a sequence of one or more video frames that continuously repeats, so if a single frame is specified, the background is static.
- One or more graphic elements 207 and 208 (such as a logo 208) which, e.g., may be linked to the background 205 or to the frame design 201-203.
- One or more thumbnails that may accompany the completed show and/or be used for presentation purposes, in e-mails or other electronic messaging, on the Internet, in marketing materials, or in any other external communications.
- One or more audio clips, which, e.g., can be automatically inserted or designated for insertion into a particular portion of a show (e.g., where there otherwise would be silence).
- One or more overlay content elements 211-214 (e.g., including stills, graphics, text, and/or video, and/or allowing for scrolling text, e.g., with the text being automated based on a user's selection) that can be designated to be displayed, e.g., on top of the background 205 and/or one or more of the frames 201-203, e.g., and with the layer level and/or transparency/opacity being specified by the user.

As discussed in greater detail below, the stored representation for any given style preferably includes a list of design elements that that are used within it, together with parameter or attribute values for each design element, with different types of design elements having different attributes. For example, text boxes 211-214 might have font attributes of type, size, color and other features (such as underlining, bold or italics) and a location attribute indicating where to place the text box within the overall video window 200. On the other hand, intro 171 or outro 177 might have attributes indicating their duration and any fadeout characteristics (172 or 176) that are desired.

Figure 16:
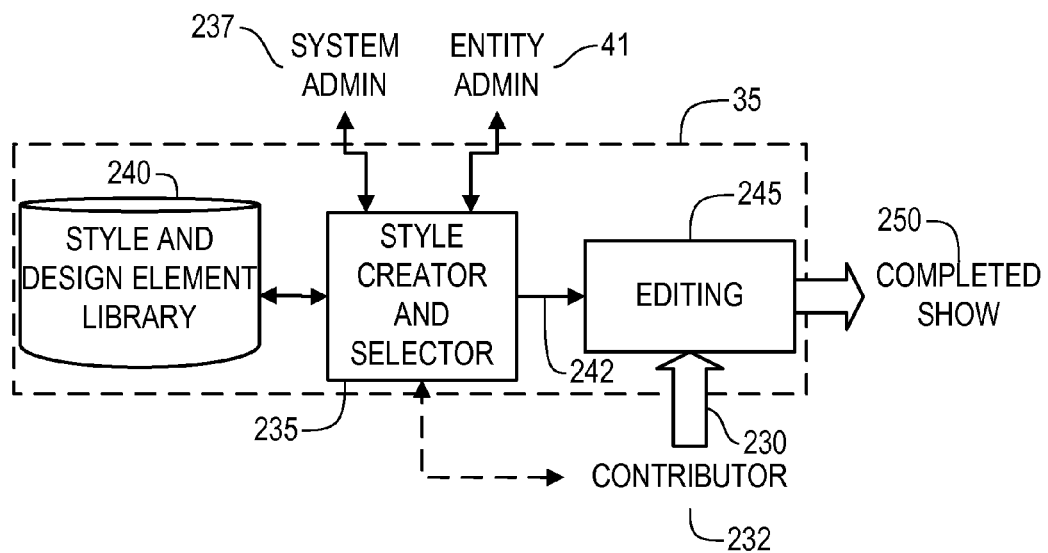
FIG. 16 is a block diagram illustrating the components for selection and design of a style and then combination of substantive content with that style to create a completed show, according to a representative embodiment of the present invention.

FIG. 16 is a block diagram illustrating the participants and components for selection and design of a style and then combination of substantive content 230 with that style to create a completed show 250, according to a representative embodiment of the present invention. In the example shown in FIG. 16, it is contemplated that a single video stream 230 will be provided by a single contributor 232, so a style that has just a single display frame will be selected. For that purpose, module 235 for creating and selecting styles is provided. Preferably, module 235 is implemented as a set of computer-executable process steps by production server 35, either alone or, e.g., after downloading a portion of such computer-executable process steps, in cooperation with one or more user devices (e.g., in order to reduce data communications and/or to offload some of the processing from server 35). Module 235 preferably provides a user interface, preferably a graphical user interface (e.g., as a special-purpose application, such as the host application discussed above, or as a webpage), through which a user can create a new style or modify an existing style, e.g., by adding or removing design elements or modifying their parameters.

Through such a user interface, a system administrator 237 designs and then submits new styles and design elements for storage into library 240, for subsequent use by users of the system 10, and also establishes criteria or rules (e.g., using a scripting language either directly or through a graphical user interface) for determining which style will be automatically applied (e.g., apply a given style only during a certain time of year and only once during any given year for any given user) to submitted shows (e.g., when automatic selection has been designated by the user) and/or provides automated (e.g., machine-learning) tools for generating and/or modifying such criteria (e.g., based on user feedback regarding satisfaction with each style that has been automatically chosen and applied and/or based on modifications that users have made to manually or automatically selected styles). The style selection rules preferably are based on user-specific information (e.g., characteristics and attributes), as discussed in greater detail below.

Optionally, if the contributor 232 is submitting substantive content 230 in his or her capacity as an employee or member of an originating entity 45, administrator 41 typically also plays a significant role, e.g., by also creating new styles and/or modifying existing styles, establishing criteria or rules (e.g., written in a scripting language) for which styles to use, and establishing restrictions on how those styles can be modified or customized by individual contributors 232 that are associated with or represent the originating entity 45. Subject to any restrictions imposed by originating entity administrator 41 (if any), the individual contributor(s) 232 preferably also have the ability to create, modify and use different styles or just accept the ones that are automatically selected by module 235.

Although not shown in FIG. 16, each of originating entity administrator 41, system administrator 237 and contributor 232 communicates with server 35 (typically via the Internet or another network) through a computer or other (typically programmable processor-based) user device, e.g., using HTML and a browser-based interface. Such a user interface preferably is used, e.g., for uploading video content, creating and modifying styles, and specifying rules for determining when such styles are to be selected. In addition, the user device for contributor 232 and/or the user device for originating entity administrator 41 preferably also is configured to provide user-specific information to the production server, e.g., by direct submission of such information through a form, by submission of ratings regarding existing styles, and/or by automatically observing activity of such users.

As discussed in greater detail below, styles and design elements preferably are pre-populated into library 240 and then updated over time by system administrator 237. Any user (e.g. an individual 232 or an organization 45 with different rights at different levels of its hierarchy) preferably can then select any existing style, modify an existing style and then use that modified style, make such a modified style available to other users (if desired), or create an entirely new style, using the techniques described herein. However, one advantage of the present invention is that, in the preferred embodiments, users need not do anything at all, in which case the system 10 preferably will automatically use an appropriate style, based on a combination of different kinds of information, including, e.g., information about the originating entity 45 (if any) and/or information about the individual contributor(s) 232. Thus, users of the system 10 can opt for complete convenience, complete control, or anything in between. For example, a user might: define its own collection of styles within library 240 and restrict selection to those styles only; allow system 10 to automatically select styles but require that the user's logo (e.g., uploaded as a JPEG file) be a top layer design element placed at a particular location in each resulting video window 200; and/or define rules (e.g., written in a scripting language) limiting what styles can be automatically selected.

In any event, when video content is received by the production server 35 from the user device of contributor 232 (and, typically, after receiving a command to create the show), server 35 preferably automatically: through module 235, applies the applicable rules (e.g., those specified by system administrator 237, subject to any overriding rules specified by administrator 41) in relation to the obtained user-specific information in order to select a style from library 240; through module 245, applies the selected style to generate a completed show 250 that includes the received video content 230 wrapped within the selected style; and then makes the completed show 250 available to the contributor 232 and/or the administrator 41.

More specifically, once a style has been selected for a particular show, the information 242 for that style is provided by module 235 to editing module 245 (which preferably includes auto-editor 120 and cutter 122), where the selected style is applied to the contributed video stream 230 to generate the completed show 250. Because just a single video stream 230 (generally corresponding to just a single participant, although multiple individuals instead might be captured in a single video) is being submitted in this example, application of synchronization 165 and cut analysis 168 is bypassed, with synthesis 169 being performed by auto-editor 120. The completed show 250 then is provided to administrator 41 and/or contributor 232 for review. At that point, any modifications to the applied style (and, in some cases, to the rule that selected the style) can be made via inputs to module 235. Upon completion of any such modifications, the show preferably is re-created using the new style information. The foregoing process can be repeated any desired number of times so that the user can continue to refine the applied style. If multiple video streams are being provided, each such stream preferably is encoded with an identifier indicating that they are all part of the same show.

As noted above, in the preferred embodiments of the invention, the originating entity 45 is given access to the library 240 of predesigned styles that are available for use through a user interface, e.g., provided by or through production server 35 and, more specifically, module 235. More preferably, such styles are divided into (or at least tagged with) categories (e.g., sports, health, cooking, holiday, self-help, etc.) and subcategories (e.g., basketball, football, hockey, tennis, etc.) so that the administrator 41 of the originating entity 45 can immediately navigate to the types of styles that are most likely to be desirable for the type of show that is being created. After navigating to the desired category or subcategory, the administrator 41 preferably just clicks on a desired style in order to preview it. At that point, the intro 171 included within the style is played, followed by a transition (if included) to the format for the substantive portion 174 of the show, including the frame design 201-203 and background 205 (preferably, for multi-participant shows, preferably with a short simulation indicating how the frame arrangement varies as different individuals are highlighted), followed by a playing of the outro 177 (e.g., with any specified transition between the show and the outro).

After reviewing the selected style, the administrator 41 preferably has the ability to accept it, select and review a different style, or modify the current style. If modification is desired, the administrator 41 preferably is presented with a menu of the design elements that are included in the current style, e.g., intro 171, frame design 201-203, background 205, and outro 177. Upon clicking on any individual one, the administrator 41 preferably then selects whether to omit it completely, replace it or modify one of its parameters. As to the second option, the provided user interface preferably highlights similar design elements of the same type (e.g., intro, frame design, background or outro, as applicable) within the same category or subcategory (so as to maximize the likelihood that the replacement will be compatible with the existing style), but also allows the administrator 41 to replace the designated design element with any other design element of the same type (e.g., any other intro), even if outside the current category or subcategory. As to the third option, for those design elements that have changeable parameters, the administrator 41 preferably just selects the desired parameter, varies it as desired (e.g., by dragging a slider on the user interface or clicking the desired radio button), previews the result, and then accepts the change or further modifies the parameter.

Examples of parameters that might be varied in this way (after having been set at a particular value in the original design of the style) can include, e.g.: the number of frames to be displayed; text to be inserted into a specified design element; use or style of drop-shadow for specified text; any other text formatting or font characteristics; color of a specified design element; temporal starting point of a specified design element; duration of a specified design element; temporal ending point of the specified design element; volume of the audio portion of the specified design element; amount of temporal overlap between a specified design element or any portion of it (such as video only or audio only) and the preceding or subsequent segment; degree of transparency/opacity for a specified design element when spatially and/or temporally overlapping an adjacent segment; specification of how to dynamically change the volume (for the audio portion) and/or transparency/opacity (for the visual portion) of a specified design element when it temporally overlaps an adjacent segment (e.g., the manner in which a video and/or audio fadeout occurs); the location within the display or frame at which a specified design element is to be displayed; and/or the layer at which a specified design element is to be displayed (e.g., above or beneath other design elements).

In addition to the foregoing options, the provided user interface preferably also allows the administrator 41 to add design elements as desired. For instance, the predesigned style might include a generic intro, to which the originating entity 45 would like to add a graphic overlay. For this purpose, as well as for replacement of design elements included in the predesigned style, the administrator 41 preferably has the ability to upload original content or select existing content from the provided library 240 of styles and design elements. For this latter purpose as well, available design elements preferably are divided into the same categories as the overall styles.

Once the style has been finalized, it preferably can be designated to become part of the show information 127. In addition, or instead, it can be saved within library 240 as a custom style to be used for future shows, either as-is or with any additional modifications that the administrator 41 wishes to make in the future.

In addition to selecting and potentially modifying existing styles (thus, effectively creating a new style), the administrator 41 preferably also can create entirely new styles from scratch in several different ways. First, the user interface preferably allows the administrator 41 to assemble design components (e.g., those available in library 240 and any additional design components uploaded by the administrator 41) in any desired manner in order to customize and design a style. In addition, the provided user interface preferably allows the administrator 41 to upload one or more still images and/or videos and, in response, module 235 automatically creates an integrated style based on such content, e.g., automatically cutting out an intro, outro and background based on such content.

Although discussed in reference to administrator 41, the foregoing interfaces and techniques also can be used by system administrator 237 or, to the extent permitted by administrator 41 (if applicable in any given instance), by contributor 232 to create new styles and/or modify existing ones. As indicated above, an individual contributor 232 mighty system 10 in his/her capacity as an employee or representative of an originating entity 45 (in which case restrictions often will be imposed by an administrator 41) and/or in an individual capacity (in which case the contributor 232 generally will have the full rights of any user of system 10).

In addition to presenting appropriate styles based on the subject matter of the show (e.g., as indicated by the administrator 41) and generating new styles based on content provided by the administrator 41 (or other user), as noted above, system administrator 237 and module 235 preferably also take other user-specific information into account in recommending, generating, selecting and applying styles. Such user-specific information can include, e.g., the user's occupation or line of business, location, gender, age, likes or preferences, political affiliations, religion, ethnic group and/or other demographics. Any of such information can be determined automatically (e.g., using geolocation) or can be received as direct submissions from the user. For instance, if a user's location is Wisconsin, module 235 might suggest or automatically apply a "Green Bay Packers" style. In addition, such style selections, recommendations and/or generation can be based on other available information. For example, if it is known that a particular user is a Democrat, module 235 might have suggested a "Vote Obama" style just prior to the 2012 presidential election. Similarly, if it is known that the user observes a particular holiday, a corresponding style might be suggested around the time of that holiday.

In certain embodiments, module 235 is configured to dynamically change styles, or at least to suggest changes to styles, throughout the day, month, season and/or year. As result, for example, a user who sends a significant number of video messages preferably has the ability to easily obtain and use different styles (although such styles often will be somewhat related or similar in some respect), and those styles can be both current and relevant. In certain more specific embodiments, such styles are customized, e.g., with a thought of the day, a joke of the day, an image of the day, references to special occasions, etc. In the preferred embodiments, users have the ability to either: (1) select or approve the style for each message or show that is sent; or (2) designate that such relevant styles will be applied automatically, so the user, without having to do anything further, will know that each new message or show will be unique. On the other hand, if the user selects the first option, he/she/it preferably also can choose to modify the proposed style (e.g., as described above) and/or choose from among several proposed styles.

Still further, in certain embodiments the provided user interface allows the user to choose an overall theme that is applied to all styles for that user's shows. For instance, if the user selects a Disney Style theme, he/she/it automatically is provided (e.g., exclusively) with different Disney styles of the user's favorite shows and characters to wrap around video messages sent to the user's family, friends and/or acquaintances.

In the preferred embodiments, the style creation and/or modification features discussed above can be applied by the user at any of a variety of different points in time. For example, the user might design a new style or modify an existing style using any or all of such features before the show to which it is to be applied is first created. In addition, or instead, after a show has been created from substantive content 230 (e.g., a recording of a multi-participant discussion or a single-participant message) and reviewed by the user, the user preferably has the option to modify or replace the style that has been applied and then rerun the automated show-creation process with the new or modified style. Still further, the user preferably has the ability to specify a new or modified style or theme for an entire collection of existing shows and then rerun the automated show-creation process with the new or modified style or theme, in which case the new style will be applied to each of the shows in the collection or, if a theme has been selected, a different style within that theme will be applied to each of the shows in the collection.

In one specific embodiment:

Each style is defined to include:
  Reference to an Intro, or no Intro.
  Reference to an Outro, or no Outro.
  Reference to an intro transition, or no intro transition.
  Reference to an outro transition, or no outro transition.
  Reference to a window frame layout.
  Reference to a background, or no background.
  Reference to a logo, or no logo.
  Reference to a way of putting a title for a participant, or no participant title.
  Reference to a way of putting a title for the show, or no show title.
  The amount, if any, to offset the time in the show a participant title appears.
  The amount, if any, to offset the time in the show a show title appears.
  An indication of which of multiple layouts this is for (single window frame, two window frames, etc., allowing for different layouts).
  A human-friendly reference.
  A unique reference.

Each of the intro and outro is defined to include:
  A reference to the media to be used.
  An indication of whether this media is to be used as an intro, an outro, or both.
  Media length.
  At what point, if any, in the media we start to use video.
  At what point in the media we stop using video.
  At what point, if any, in the media we start to use audio.
  At what point in the media we stop using audio.
  A human-friendly reference.
  A unique reference.

A transition is defined to include:
  The name of the transition.
  The length of the transition.
  Is this a transition to be used after an intro, before an outro, or at a user designated point in the show?
  How far from an end of one set of media should the transition be aligned.
  A human-friendly reference.
  A unique reference.

A title for a participant (or, correspondingly, a frame) is defined to include:
  The type of bounding box into which the participant's title should be placed (usually correlates to a graphical background on a deeper layer to help it stand out when displayed).
  Font size.
  An indication of which of multiple layouts this is for (single window frame, two window frames, etc., allowing for different layouts).
  A human-friendly reference.
  A unique reference.

A title for the show (which in the current embodiment can be one or two lines) is defined to include:
  Size and location of the single line.
  Font size to be used with single line.
  Size and location for each of two lines (they do not have to be the same length).
  Font size to be used with two lines.
  How the text is to be justified (e.g., left, right or centered)?
  An indication of which of multiple layouts this is for (single window frame, two window frames, etc., allowing for different layouts).
  A human-friendly reference.
  A unique reference.

The background is defined to include:
  A reference to the media to be used as a background.
  Whether the background media is a static image or video.
  If the background media is a video, how long does the video play and is it to be repeated?
  A human-friendly reference.
  A unique reference.

As discussed above, the auto-editor 120 assembles a representation 124 of the format for the finished show 130 or 250. This representation 124 can be expressed directly in a form that can be understood by the selected cutter 122 so the finished show 130 or 250 can be created. However, in the preferred embodiments, it is first expressed in a more generic format using references and descriptions of actions that can be translated into an instruction set that is comprehensible to be selected cutter 122, thereby providing adaptability for use with a number of different cutters 122.

The generic format preferably includes the equivalent machine representation of "use this file to represent the first participant," "at this time, change presented focus to the second participant," "use that file as the background, and repeat it as many times as necessary end-to-end to pad out to the length of the finished show," etc. These descriptions of what is to be done preferably are associated with layers, because cutters 122 typically assemble media from a layered stacking Thus, different titles are put on their own layers, as are window frames, participant media, the background, etc.

As previously described, participant media is also adjusted to fit in the frames associated with a particular style for the number of participants being shown at that time. The auto-editor 120 adjusts what it does based on the information represented by a style. Afterward, a show can be recreated by the auto-editor 120 based on a different style selection.

In the preferred embodiments, the auto-editor 120 produces its own title media (e.g., for titles 211-213) so as to remain independent of the capabilities of the various cutters 122. In this regard, some cutters 122 do not have an innate titling ability, while other cutters do, but even in this latter case, making titles within the auto-editor 120 preserves product uniformity, independent of the cutter 122 that is being used.

One aspect of the synthesis 169, performed by auto-editor 120, is the specification of how the input audio videos are to be inserted into the frames 201-203 that have been specified to be included within the selected style. For this purpose, auto-editor 120 preferably identifies a spatial point in the incoming video stream to be used as the center of the frame and a scaling factor. Then, anything outside the boundaries of the display frame 171-173 into which such video is to be inserted is automatically cropped out. Both the center point and the scaling factor can be automatically varied over time, e.g., based on motion analysis to bias toward keeping the center point at the center of activity and cropping out areas that do not appear to have any significant activity, based on facial-recognition techniques to bias toward keeping all of the people as centered as possible within the frame and cropping out areas that do not include people, based on speaker analysis to bias toward centering on the individual who appears to be speaking at the moment, and/or based on any (e.g., weighted) combination of the foregoing results.

The foregoing embodiments often concern the production of a program in which multiple, often geographically dispersed, participants are interacting with each other in real time. However, as also noted above, the systems, methods and techniques of the present invention can be used in a variety of other contexts as well.

Most basically, an originating entity 45 can specify just a single frame for a single participant, in which case the frame-emphasis techniques described above need not be used. However, automatic application of styles and/or other aspects of the present invention still would be very useful, e.g., for generating a personalized video blog or a video greeting card, each of which being an example of a "show", as that term is broadly used throughout this disclosure.

Alternate Interview Embodiments

Figure 17:
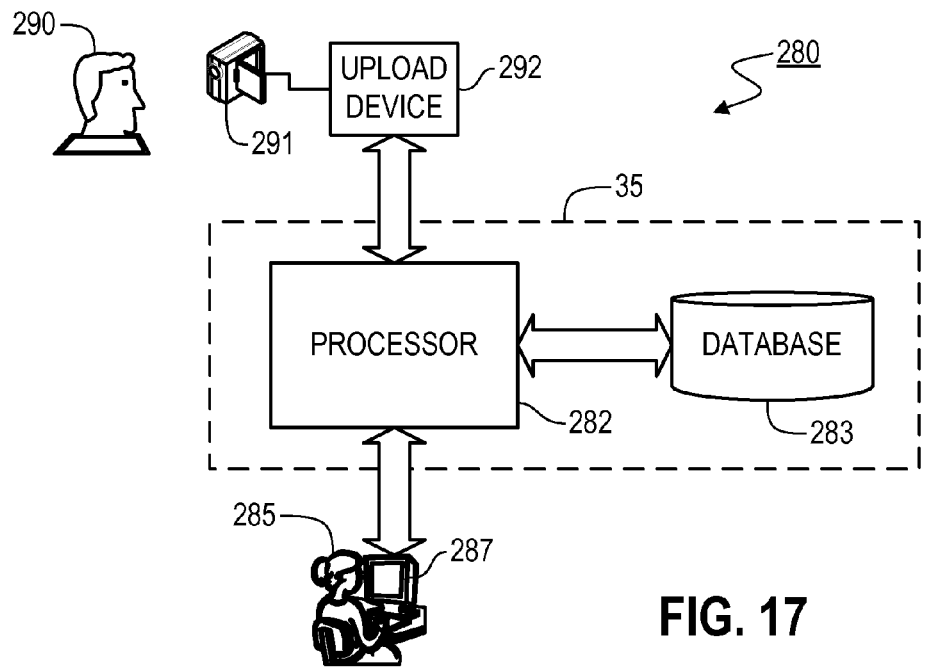
FIG. 17 is a block diagram illustrating a structure for creating an interview show according to a representative embodiment of the present invention.

The foregoing embodiments create shows using multiple video feeds corresponding to multiple different participants communicating with each other in real time or using a single video feed that captures one or more individuals. In addition, a system 10 according to the present invention can be used in a variety of other ways. For example, FIG. 17 is a block diagram of a representative system 280 for creating interview shows in which the interviewer and the interviewee (i.e., the participants in the completed show) need not communicate with each other in real time.

In the present embodiments, the production server 35 includes a processor 282 and a database 283 that stores, among other things, video recordings of interviewer questions. According to one aspect of the present embodiments, a user 285 (e.g., any of the user types mentioned above), communicating with server 35 through a computer or other user device 287 (e.g., via an electronic network such as the Internet), retrieves questions from server 35 and then submits one or more videos of herself responding to them. In the preferred embodiments, the user device 287 is configured to separately present each question and then upload a separate video clip for the response to it. More specifically, such interactions preferably occur through a user interface provided by server 35. Such a user interface can be, e.g., a Web-based interface or an interface displayed by a proprietary application (such as the host application discussed above) that has been downloaded from server 35 to user device 287.

Upon uploading such video(s) and, typically, clicking on a "create show" button (or other user interface element), processor 282 preferably creates the show by combining the video-recorded questions and answers, e.g., using any of the techniques described herein. However, in this embodiment there typically is no need to perform a separate cut analysis. Instead, processor 282 can just sequentially emphasize: the first question, then the first response, then the second question, then the second response, etc.

In the foregoing example, the user 285 is the interviewee. Several variations on this example are possible. Preferably, videos of an interviewer (e.g., individual 290) asking a number of questions (more preferably, a separate video clip for each question) have been pre-recorded (e.g., in a studio using a camera 291 and computer or other uploading device 292) and then stored in database 283. The interviewer 290 could be, e.g., a well-known personality, a professional interviewer and/or an actor. In certain embodiments, the questions within database 283 are organized by subject matter and/or optimal location within an interview. For example, each such question might be categorized (or labeled) as pertaining to a "New Business", "New Book" or "General Introduction", so that a given user 285 can select the category that most accomplishes the purpose she is trying to achieve. In addition (or instead), each such question might be categorized (or tagged) as: "Introductory", "Middle Segment" or "Closing" to indicate where in the interview it should be placed. More preferably, there are at least 5-10 questions for each category combination, so there is a significant amount of variety. In addition, the pre-stored questions may have been recorded by a variety of different interviewers 290 (e.g., with each question having been asked by different interviewers 290 or with different interviewers 290 asking different questions), so that the user 285 can select whom she would like to interview her.

Then, if the user 285 wants to post a video of herself being interviewed by a particular well-known personality about her new website, she might simply click on "New Business" and the name or photograph of her desired interviewer. In response, processor 282 preferably automatically randomly selects and downloads to user device 287 (e.g., through the provided user interface) three questions (unless user 285 has selected a different number) from that category, e.g., one "Introductory" question, one "Middle Segment" question and one "Closing" question. User 285 records her responses (preferably as separate video files) and then uploads them (e.g., through the provided user interface) to server 35. In certain embodiments, the provided user interface requires user 285 to record a response immediately or within a specified amount of time (e.g., no more than 5 or 10 seconds) after the question has been played on device 287, in order to simulate a live interview. In other embodiments, the user 285 is permitted to study the questions in advance, prepare her responses to them, record multiple takes for each response, edit recorded responses, and/or even splice together portions of different response recordings before uploading them to the server 235.

After the response recordings have been received, processor 282 automatically combines the questions and responses to create the show. Several variations exist. For example, if a question recording ends immediately after the question has been posed, then in the finished show, there ordinarily would be a single video display frame, alternating between the interviewer 290 and the interviewee 285 (e.g., as if a live interview had been shot with two cameras). Alternatively, if the video of the question included a period of time after the question had been posed where the interviewer 290 seems to be listening to a response, then both display frames might appear simultaneously in the overall video window 200, with the current speaker's frame being emphasized. In this case, the response of the user 285 typically would be required to be of a specified duration, corresponding to the duration that the interviewer 290 is appearing to listen. As a further alternative, a set of clips showing the interviewer 290 appearing to listen to a response for different periods of time also have been pre-recorded and stored in database 283. Then, when the emphasis changes from the interviewer 290's frame to the user 285's frame, processor 282 might replace the question clip with a "listening" clip that has been selected so as to match the duration of the response provided by user 285. In any event, once the show has been created, it is communicated, delivered or made available to the user 285 (e.g., via the Internet or another network).

By virtue of the foregoing processing and interactions, it typically is possible for a user 285 to obtain, within a very short period of time (e.g., less than an hour), a professional-looking show in which she is being interviewed, e.g., by well-known personality. However, if more-specific questions are desired, the provided interface can permit the user 285 to submit questions (e.g., in writing) to be asked (e.g., by a designated interviewer, if available within the designated time period). Upon receiving a specified number of questions for the interviewer 290, processor 282 preferably automatically sends an electronic message to that interviewer 290 requesting the scheduling of a recording session. Then, after such questions have been recorded and stored in database 283, processor 282 preferably automatically sends an electronic message to user 285 notifying her that her interview is ready to be conducted.

Although the embodiment discussed above uses questions categorized by topic and/or by position within the interview, other embodiments just randomly select from a pool of uncategorized questions (e.g., including 100 or more questions). In either such case, rather than using random selection, the selection may be based on identified characteristics of the user 285 (e.g., gender, age, geographic location, known likes and/or dislikes, known acquaintances, occupation, etc.). Also, in the preferred embodiments a given user 285 is not presented the same question twice unless found until the pool of available questions has been exhausted.

In an alternate embodiment, the user 285 is the interviewer and a well-known personality 290 is the interviewee. For this purpose, the individual 290 preferably has pre-recorded a number of statements and had them stored into the database 283, and the general process is that: the user 285 records questions (e.g., each in a separate video file, through a user interface downloaded from server 35 to user device 287) and then uploads them to server 35, which automatically combines them with the stored responses (e.g., using any of the techniques described herein) to create the completed interview show, which is then delivered, communicated, or otherwise made available to user 285 through device 287. Several variations on this embodiment also are possible. For instance, processor 282 might select responses to individual questions on a purely random basis (e.g., so that the resulting show will be humorous). Alternatively, processor 282 might attempt to match responses to questions using speech recognition and/or manual transcription together with a keyword-matching technique. Still further, the user 285 might be provided with access to the responses (e.g., with responses randomly assigned and/or with the user 285 having the ability to browse and choose the responses she wants to use) before she poses her questions so that she can tailor each question to the response.

The foregoing discussions generally concern of the creation of a single show that typically spans a relatively short period of time (e.g., less than 15 minutes, 30 minutes, one hour or two hours) and involves just a handful of separate video feeds (e.g., not more of than 3-8). In the preferred embodiments, the finished show is presented in a standard video format (e.g., MPEG, AVI, MOV, MP4 or FLV), typically flattened and rendered as a continuous sequence of video frames, so that the various layers (e.g., image, graphics and text) and the various original temporal segments are no longer easily separable.

In any event, the term "show" as used herein generally refers to a self-contained package that can be played on a standalone video player without access to any additional content. The styles referenced above typically include multiple user-controlled and/or automated design elements, e.g., occupying multiple different layers and time segments. These design elements wrap around the original video content and are added to and become a part of the completed show. This is in contrast to a webpage, where design elements essentially are just wrapped around a video, with the video being just one component that is populated into the webpage along with other elements. A show according to the present invention, including the original video(s) and the added style, can be downloaded and distributed on other websites, or on other devices, without having to be included within or played through a Web browser.

Event-Based Embodiments

The present section discusses event-based embodiments where the resulting product can span longer periods of time and/or can involve many more video feeds than is the case with the embodiments discussed above. In addition, the present embodiments might or might not result in the creation of a discrete, fixed, playable video show (such as MPEG or the like). In addition (or instead), the present embodiments often will provide flexible ways for displaying and viewing multiple video feeds corresponding to a particular event. As will become readily apparent, the term "event" preferably can be defined by a user of the system 10 in any desired way and, often, the identification of an "event" will just serve as a central point (typically organized around something that is happening and/or some theme) to which other users may submit live and/or prerecorded video and, depending upon the specific embodiment, other types of content such as audio only, still images and/or text.

Generally speaking, an "event" can be started anytime and the content submitted in connection with it can be organized in a variety of different ways, such as by time, location and/or metadata that has been gathered from the participants. In addition, an event can be used in tandem with a show, e.g., allowing a multi-participant show to be submitted (e.g., uploaded) to be part of an event.

One example of such an event-based embodiment can be thought of as a time-shifted video-recorded conversation. In this embodiment, the user interface provided by server 35 permits any individual user (acting as an originator) to submit a question, provide a topic or theme, make a call to action, or provide any other verbal starting point (e.g., in video form, audio-only form or text form), and this verbal starting point (sometimes referred to as the original topic) is then defined as the "event". Thereafter, the user interface: provides a link to the originating user which can then be forwarded to anyone that the originating user wants to invite into the conversation; directly permits the originating user to invite others into the conversation (e.g., via the social or user network provided by system 10); and/or allows the originating user to define the criteria pursuant to which others may participate in the conversation (e.g., "everyone", "anyone over the age of 18", "my coworkers", etc.).

Then, e.g., when someone logs into his/her account within the system 10 (e.g., through the user interface provided by server 35), he/she will be able to browse and/or search all the conversations (and other events) he/she has permission to join, and clicking on any one allows the user to create a comment or other submission (e.g., text and/or recorded video or audio), upload it, and thereby have it associated with that event (as described in greater detail below). In addition, anyone who receives a link to the conversation (or other event) can follow it to a user interface provided by server 35 and then create a comment or other submission, upload it, and thereby have it associated with that event (preferably irrespective of whether or not such individual has an account with system 10). Still further, server 35 preferably sends everyone who submits such a comment notifications as the conversation is updated (e.g., if the individual has elected to receive such updates), e.g., on whatever schedule is selected by the user (e.g., in response to each new submission, only submissions that comment on or otherwise respond to their own submissions, or only submissions that are receiving a specified minimum amount of feedback, "likes", etc.).

In addition to submitting a comment on the original topic, other users with permissions or invitations preferably can view, browse and/or search others' comments and, if desired, submit comments any one or more of them. When such a comment is made in reply to another user's comment, the new comment can be visually designated as such, e.g., by displaying it as a sidebar or using any other display technique indicating the comment to which it pertains. It should be noted that the term "comment" should be understood broadly to include submission of any content, e.g., so that a user might submit an audio or video news clip, a photograph with a voice-over comment, or a text-based submission that is relevant to the original topic or to someone else's comment.

In the preferred embodiments, once the originator or host of the conversation decides that enough input has been received, he/she preferably can simply click a button on the user interface which causes a "create show" message to be sent to server 35 and, in response, the auto-editor 120 compiles all of the video submissions into one show (e.g., using any of the techniques described herein) that can be distributed in various ways, including shared to other social networks and/or video-sharing sites. In the preferred embodiments, auto-editor 120 assembles the comments: in the order received; by keeping associated comments together (e.g., based on whether a comment was made on the original topic or another comment and/or based on keyword matching after applying speech recognition or manual transcription); and/or based on popularity of the received comments (e.g., as indicated by the number of comments the comment received and/or by express user ratings). Upon viewing the show, the originating user, through the provided user interface, preferably can easily edit out the parts of the conversation that are not relevant, add in b-roll, other inserts or other content in the desired parts of the show, modify the style, and/or make any other desired changes, and then have the show recompiled with such changes. This review/modify/recompile sequence preferably can be repeated as many times as desired. In addition, or instead, as indicated above, all of the submitted video comments can remain available online for the participants to search, browse, view, and further comment on.

The following is a sequence of steps for creating a conversation show in the foregoing manner in accordance with one representative example:

Part 1—Starting the Conversation:
A User opens the app
The User clicks "yes" to the question: "want to start a Conversation"?
The app prepares to record a show
The User makes a statement, asks a question or states a call to action
The show finishes and process normally
A link comes back to the User to share with others or offers the option to make the conversation available to everyone and/or everyone on his/her network
Part 2—Joining the Conversation
A User, or non-User gets a link to "Join a Conversation"
The User clicks 'Yes'. The app opens, or the User gets a prompt to download the app
When the App opens there is an option that says: "You've been invited to Join a Conversation . . . want to join"
The User clicks 'yes'.
The First part of the conversation plays then pauses
Then the record light comes on
The user clicks the button to start the show
The recording starts and the User responds
When the recording ends the User has the option to 'keep' or 'do over'
If the user says 'keep' they can upload the response, or add more
Once the User is done, he/she can click upload
The show is uploaded to the Conversation
Part 3—Following the Conversation
As text, audio and video are uploaded to the Conversation all the contributors continue to get updates when something is added
The contributors can play the Conversation in whole or in part at any time
Anyone who has the original link can follow the Conversation, too, but they aren't automatically updated
Part 4—Editing the Conversation
The originator of the Conversation can delete or add one or all of the parts of the Conversation chain at any time
Part 5—Sharing the Conversation
The originator can click a button that assembles all the parts of the Conversation into one video to be shared via any social network, or downloaded, or sent to a designated video-sharing site As used herein, the term "app" refers to a software application that includes functionality from the participant application 80 and the host application discussed above.

In the preferred embodiments, the provided user interface preferably includes an interface element that allows the originator, when conducting and/or recording conversations over time in the foregoing manner, to specify that responses to any previous submission will not be permitted if there is a pending response underway. In such a case, e.g., the other users' "add comment" button preferably is made inactive from the time another user had already clicked on it until that other user's comment had been uploaded and shared (or, in some cases, after a specified period of time had elapsed and no comment had been uploaded). Only then could another user add to the conversation.

Another example of an event-based embodiment gathers single-person and multi-person shows and links them together in a format that can be organized in a variety of different ways (e.g., by time, location and/or tag). These events preferably also are created by an organizer who names the event and then invites participants, e.g., via system 10's internal social or user network and/or by sending a link via any electronic messaging system (e.g., e-mail, text messaging, Twitter, or any other social network messaging system). Permitted participants, upon logging into system 10's social or user network or upon receiving an invitation, preferably just click on the event link and then server 35 allows them to create and/or upload their finished (one-, two-, three- or four-person) show, still images or text to be associated with the event.

Server 35 then presents these uploaded shows in any of a variety of different ways. In accordance with one approach, server 35 organizes each of the shows chronologically (e.g., based on the timestamp inserted at the time of recording or based on the time of uploading) and, through the provided user interface, allows users to watch one show after another. As a result, the originator (or another user) could send someone a link to a particular event and then that individual could watch from start to finish all the shows that have been uploaded (e.g., corresponding to different perspectives of all the users viewing the same occurrence who uploaded content to that event), e.g., in chronological order.

A related approach is to display multiple different shows and/or live video feeds on a single display window, with each such show or feed presented in its own display frame (or box), so that for any given point in time there is a box playing the portion of an uploaded show corresponding to that timestamp and/or playing a live feed that is/was being streamed at that time. As result, the more participants at any given time, the more boxes would be displayed. Depending upon the embodiment and/or the style chosen by the originating entity 45, the boxes, e.g., could be scaled to fit the overall display window (e.g., smaller boxes when there are more participants) or could have static sizes (e.g., more background exposed when there are fewer participants). Also, in either case the auto-editor 120 can emphasize one or more boxes, e.g., using any of the techniques described herein.

Figure 18:
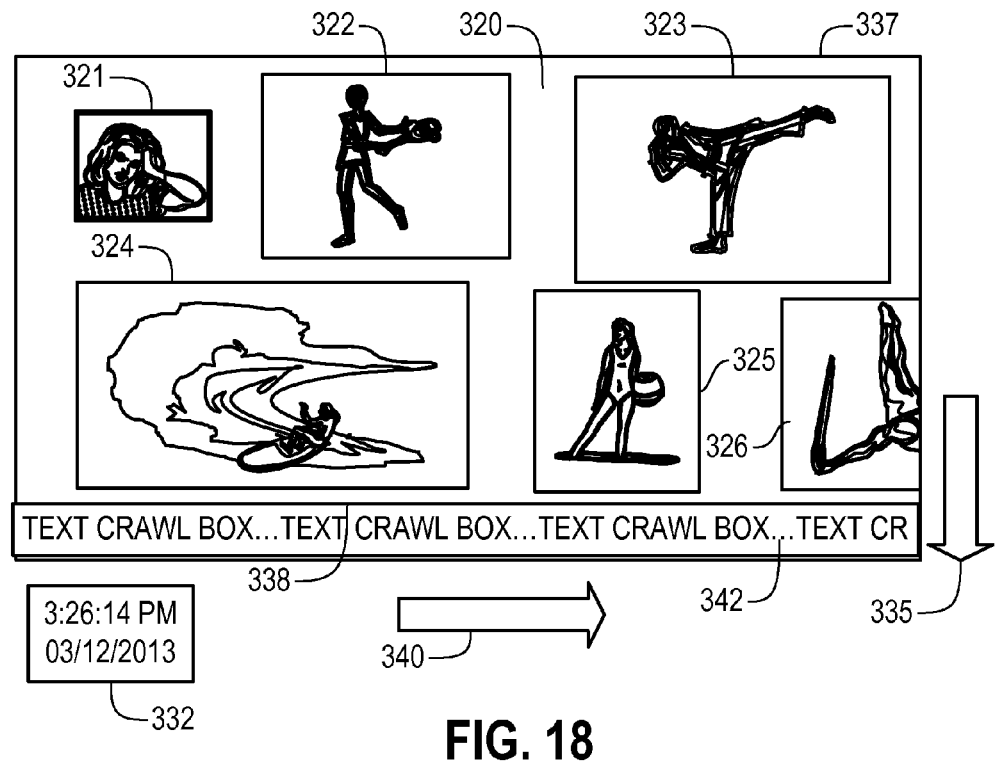
FIG. 18 illustrates a display interface according to a representative embodiment of the present invention.

An alternative display technique is shown in FIG. 18. In this approach, an overall display window 320 (e.g., in 16:9 high-definition format) is presented to the user. Included within window 320 are complete boxes 321-325 and part of box 326, each displaying a show (or other piece of content) that was submitted (e.g., excluding any content that was filtered out by the originator and/or by server 35). Preferably, by default, these boxes scroll from left to right (or right to left), e.g., as content is added and/or to present portions of shows that cannot all be fit within window 320 at one time. Thus, box 326 has moved across window 320, and the right-hand portion of it has been shifted out of window 320 so that such portion is no longer visible in FIG. 18. In certain embodiments, the scrolling occurs at a fixed rate or speed, effectively allowing viewers to see each displayed show for a fixed duration (e.g., 15-30 seconds), representing the amount of time it would take each box to completely move across the window 320. Also included within the interface displayed in FIG. 18 is a time and date indicator 332 which shows the time and date that is currently being viewed and which preferably can be changed by the viewer to jump ahead or back to a different point in time.

Clicking on any particular show preferably causes that show to occupy the entire display window, e.g., with controls for allowing the user to jump ahead or jump back in time and with a "return to original" button that can be clicked to return to scrolling window 320 at the point in time at which the viewer left window 320, as well as a "return to current moment" button that can be clicked to return to scrolling window 320 at the same point in time at which the viewer is watching the current show. The foregoing functionality allows a viewer to essentially zoom-in on any particular show, watch any desired portions of it, and then return to the scrolling view when finished.

In some cases, the amount of content that can be displayed within window 320 is insufficient to cover all of the different shows that have been uploaded with respect to a particular point in time. For that purpose, the auto-editor 120 preferably selects videos to be inserted based on pre-specified and/or user-specified criteria, such as amount of activity happening within each show or increased diversity. With respect to diversity, it often is desirable to obtain an overview that is as complete as possible with regard to what is happening in relation to an event, rather than just seeing shows that are largely redundant of each other. Thus, for example, auto-editor 120 might attempt to ensure that at least two videos of the occurrence itself (e.g., taken from different locations based on geo-tagging, thereby achieving geographic diversity) and at least one talkshow about it (thereby achieving show-type diversity by combining videos of the occurrence with commentary about it) continually are included within window 320.

Also for coping with coping with a larger number of shows then can be displayed at one time, in the present embodiment a time-slice-mode button 335 is included. Clicking on button 335 causes the display 320 to switch to a mode in which all content corresponding to the current time segment (e.g., 15-30 seconds in duration beginning at the moment currently displayed on the time and date indicator 332) can be viewed. More specifically, in the current embodiment, clicking button 335 causes the display to begin scrolling vertically (instead of horizontally), with the top 337 of window 320 representing the time shown on indicator 332 (which preferably remains frozen in this mode) and the bottom 338 of window 320 representing a time 15-30 seconds later (the time required for each box to move vertically down window 320). In this way, the viewer can see everything that is happening in relation to an event at a particular interval in time. At any point, clicking on normal-mode button 340 returns to the original horizontal-scrolling mode described above.

Certain events will have an associated reference stream (typically including audio) that can be used to time-synchronize the different shows that are uploaded. For example, for an event called "Super Bowl Party", where people upload 30 seconds from their individual parties, the Super Bowl television broadcast typically will be playing in the background of each uploaded stream or show, and the audio (and/or, in some cases, the video) from it can be used to time-synchronize the submitted videos. For other events, any other broadcast can be used for this purpose, including television, radio or live (e.g., over a public-address or other amplifier system) broadcasts.

Alternatively, in certain embodiments different people stream their videos and/or audio in real time, e.g., using a kind of Web-based conference line. For this purpose, the event or show link preferably includes a conference line number or other instructions as to how to join in the conference stream. These live videos then can be populated in real-time (or with a short delay, e.g., of 2-3 seconds, to permit any filtering or censoring) into a real-time broadcast of window 320 for current viewing and/or recorded for later viewing through window 320 (e.g., with the upload times being used as the timestamps).

In one specific example, a link to join an event is sent out (e.g., via Twitter, email or any other means). Clicking on the link and then logging in (or first downloading the app if one does not already have it), allows the participant to upload live video (single or multi streams), still images or text for the event, which are then compiled into the event presentation, e.g., as described above. Such still images and text can be displayed in the manner discussed above. However, it often will be preferable to display such other types of content in ways that are more suited to them. For example, uploaded text can be displayed in a "crawl" 342 at the bottom of the videos and still images (e.g., beneath window 320), e.g., time-synchronized with the displayed shows based on when it was submitted. For still images, which typically do not need to be displayed for the entire 15-30 seconds that it would take for box to traverse the window 320, it might be preferable to dedicate one or more boxes to a "slideshow" in which different still images are displayed at a faster rate (e.g., every 2-3 seconds).

Additional Features.

Several of the embodiments discussed above concern multi-participant composite shows in which there are 2-4 participants submitting separate video feeds, and one display frame is emphasized at a time. However, similar techniques can be used for larger numbers of participants. In certain embodiments, when there are more than 4 participants, the participants are divided (e.g., arbitrarily) into groups that are no larger than 4 participants (e.g., groups of 2 and 3 when there are 5 total, or 4 groups of 4 when there are 16 total). Then, one participant is selected from each group (e.g., using the techniques described herein), and the display frames for these selected participants would be emphasized. The other participants either would be hidden or would be de-emphasized (e.g. with their display frames made smaller and set off to the side), e.g., depending upon available display space. For instance, with a total of 8 participants there might be 2 larger display frames and 6 smaller ones. Alternatively, the originating entity 45 might choose to automatically suppress the display of one or more participants, e.g., as part of an available style.

Such selection also can be repeated any number of times. For instance, in one embodiment, from a total of 32 participants, 8 groups of 4 would be identified and, using the foregoing technique, 8 participants would be emphasized on screen. A second repetition could be added to reduce this number further by having the auto-editor 120 to identify, e.g., 4 from that group who would be emphasized on screen (with the others hidden or deemphasized). Preferably, when there are more than 4 total participants, the audio tracks of one or more are muted, either automatically by auto-editor 120 or manually during review of the completed show by the originating entity 45 (e.g., through the provided user interface).

In addition to recording and uploading new content, the app preferably permits a user to upload pre-recorded material to server 35 to be used as part of a user-designated show or event. For purposes of creating the corresponding show or event, where a timestamp is considered, server 35 can use, e.g., the timestamp that is included on the original material or the timestamp of when the material was uploaded to server 35.

In the preferred embodiments, the app (particularly when implemented as a mobile app) provides seamless access to, and ability to upload from, a variety of media sources, such as Web-video-capture software, Web-image-capture-software, video and audio creation software, video and audio management software, and the like. After having selected a particular show or event through the app, any media that is uploaded preferably is tagged with a unique identifier for that show or event and becomes associated with it in server 35. In addition, or instead, when uploading any such media outside of a particular show or event, the app preferably provides the user an interface element for designating a show or an event with which it is to be associated.

When creating a show and working with the particular style through the provided user interface, the originator preferably can designate different submitted content (e.g., stills, video, graphics, text, etc.) to be inserted into different design elements of the top video layer (or any other video layer associated with the selected style). For example, one design element might be configured to hold scrolling test. Another would take a number of stills and divide their presentation over a particular box (or other visual space) over the duration of the show, e.g., in equal parts.

In the preferred embodiments, the app is implemented as a "bolt-on" for existing video and/or audio conferencing applications, such as conferencing engines telephonic surfaces or voice-over-Internet-protocol (VOIP) services, and/or for Web broadcasting services. Then, when using any such service, simply activating the app provides access to all of the functionality described herein. As noted above, in the preferred embodiments a 'splitter' provides a separate recorded stream (typically higher-quality for use in the present processing) from the conference or real-time stream (sometimes lower-quality to accommodate bandwidth constraints), so both services can share hardware resources (e.g., camera and microphone) in a seamless fashion.

In addition to the content-synchronization methods described above, other synchronization methods may be used. According to one, referred to as a 'checkerboard sync', the peaks of one participant's speech (i.e., when the participant is speaking or speaking loudly) are aligned with the valleys of another's (i.e., when that other participant is not talking or is speaking very quietly). The present inventors have discovered that the result often can be the same as if there were an actual start-sync marker. According to another synchronization method (which might be particularly useful for a multi-camera single location show), the sound waveforms are matched, so that if there were four camera/microphone units in the same location picking up the same event, the combined audio signal would minimize or eliminate echo. The result can be multiple video feeds that are closely synchronized together. In addition to using such video feeds as otherwise described herein, they also can be 'stitched together' using image-processing techniques, e.g., to render three-dimensional (3D) of images, holographs and higher-resolution still images and video than would be possible with any single video signal.

System Environment

Generally speaking, except where clearly indicated otherwise, all of the systems, methods, functionality and techniques described herein can be practiced with the use of one or more programmable general-purpose computing devices. Such devices (e.g., including any of the electronic devices mentioned herein) typically will include, for example, at least some of the following components coupled to each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a FireWire connection, or using a wireless protocol, such as radio-frequency identification (RFID), any other near-field communication (NFC) protocol, Bluetooth or a 802.11 protocol); software and circuitry for connecting to one or more networks, e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system, which networks, in turn, in many embodiments of the invention, connect to the Internet or to any other networks; a display (such as a cathode ray tube display, a liquid crystal display, an organic light-emitting display, a polymeric light-emitting display or any other thin-film display); other output devices (such as one or more speakers, a headphone set and/or a printer); one or more input devices (such as a mouse, touchpad, tablet, touch-sensitive display or other pointing device, a keyboard, a keypad, a microphone and/or a scanner); a mass storage unit (such as a hard disk drive or a solid-state drive); a real-time clock; a removable storage read/write device (such as a flash drive, any other portable drive that utilizes semiconductor memory, a magnetic disk, a magnetic tape, an opto-magnetic disk, an optical disk, or the like); and/or a modem (e.g., for sending faxes or for connecting to the Internet or to any other computer network). In operation, the process steps to implement the above methods and functionality, to the extent performed by such a general-purpose computer, typically initially are stored in mass storage (e.g., a hard disk or solid-state drive), are downloaded into RAM, and then are executed by the CPU out of RAM. However, in some cases the process steps initially are stored in RAM or ROM and/or are directly executed out of mass storage.

Suitable general-purpose programmable devices for use in implementing the present invention may be obtained from various vendors. In the various embodiments, different types of devices are used depending upon the size and complexity of the tasks. Such devices can include, e.g., mainframe computers, multiprocessor computers, one or more server boxes, workstations, personal (e.g., desktop, laptop, tablet or slate) computers and/or even smaller computers, such as personal digital assistants (PDAs), wireless telephones (e.g., smartphones) or any other programmable appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented by a general-purpose processor executing software and/or firmware, by dedicated (e.g., logic-based) hardware, or any combination of these approaches, with the particular implementation being selected based on known engineering tradeoffs. More specifically, where any process and/or functionality described above is implemented in a fixed, predetermined and/or logical manner, it can be accomplished by a processor executing programming (e.g., software or firmware), an appropriate arrangement of logic components (hardware), or any combination of the two, as will be readily appreciated by those skilled in the art. In other words, it is well-understood how to convert logical and/or arithmetic operations into instructions for performing such operations within a processor and/or into logic gate configurations for performing such operations; in fact, compilers typically are available for both kinds of conversions.

It should be understood that the present invention also relates to machine-readable tangible (or non-transitory) media on which are stored software or firmware program instructions (i.e., computer-executable process instructions) for performing the methods and functionality of this invention. Such media include, by way of example, magnetic disks, magnetic tape, optically readable media such as CDs and DVDs, or semiconductor memory such as various types of memory cards, USB flash memory devices, solid-state drives, etc. In each case, the medium may take the form of a portable item such as a miniature disk drive or a small disk, diskette, cassette, cartridge, card, stick etc., or it may take the form of a relatively larger or less-mobile item such as a hard disk drive, ROM or RAM provided in a computer or other device. As used herein, unless clearly noted otherwise, references to computer-executable process steps stored on a computer-readable or machine-readable medium are intended to encompass situations in which such process steps are stored on a single medium, as well as situations in which such process steps are stored across multiple media.

The foregoing description primarily emphasizes electronic computers and devices. However, it should be understood that any other computing or other type of device instead may be used, such as a device utilizing any combination of electronic, optical, biological and chemical processing that is capable of performing basic logical and/or arithmetic operations.

In addition, where the present disclosure refers to a processor, computer, server, server device, computer-readable medium or other storage device, client device, or any other kind of apparatus or device, such references should be understood as encompassing the use of plural such processors, computers, servers, server devices, computer-readable media or other storage devices, client devices, or any other such apparatuses or devices, except to the extent clearly indicated otherwise. For instance, a server generally can (and often will) be implemented using a single device or a cluster of server devices (either local or geographically dispersed), e.g., with appropriate load balancing. Similarly, a server device and a client device often will cooperate in executing the process steps of a complete method, e.g., with each such device having its own storage device(s) storing a portion of such process steps and its own processor(s) executing those process steps.

As used herein, the term "coupled", or any other form of the word, is intended to mean either directly connected or connected through one or more other elements or processing blocks.

Additional Considerations.

In the event of any conflict or inconsistency between the disclosure explicitly set forth herein or in the attached drawings, on the one hand, and any materials incorporated by reference herein, on the other, the present disclosure shall take precedence. In the event of any conflict or inconsistency between the disclosures of any applications or patents incorporated by reference herein, the more recently filed disclosure shall take precedence.

In certain instances, the foregoing description refers to clicking or double-clicking on user-interface buttons, dragging user-interface items, or otherwise entering commands or information via a particular user-interface mechanism and/or in a particular manner. All of such references are intended to be exemplary only, it being understood that the present invention encompasses entry of the corresponding commands or information by a user in any other manner using the same or any other user-interface mechanism. In addition, or instead, such commands or information may be input by an automated (e.g., computer-executed) process.

In the above discussion, certain methods are explained by breaking them down into steps listed in a particular order. However, it should be noted that in each such case, except to the extent clearly indicated to the contrary or mandated by practical considerations (such as where the results from one step are necessary to perform another), the indicated order is not critical but, instead, that the described steps can be reordered and/or two or more of such steps can be performed concurrently.

References herein to a "criterion", "multiple criteria", "condition", "conditions" or similar words which are intended to trigger, limit, filter or otherwise affect processing steps, other actions, the subjects of processing steps or actions, or any other activity or data, are intended to mean "one or more", irrespective of whether the singular or the plural form has been used. For instance, any criterion or condition can include any combination (e.g., Boolean combination) of actions, events and/or occurrences (i.e., a multi-part criterion or condition).

In the discussions above, the words "include", "includes", "including", and all other forms of the word should not be understood as limiting, but rather any specific items following such words should be understood as being merely exemplary.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A system for creating video programming, comprising:
   (a) a processor-based production server that has access to a library of existing styles for wrapping around video, each of said styles including a specific arrangement of design elements;
   (b) a processor-based contributor device configured to accept input of video content and electronically transfer said video content to the production server via a network; and
   (c) a processor-based administrator device, providing a user interface that permits a user to: (i) design new styles and modify said existing styles, (ii) specify rules as to when particular styles are to apply, and (iii) electronically communicate said new and modified styles and said rules to the production server,
   wherein upon receiving said new and modified styles from the administrator device, the production server incorporates said new and modified styles into the library to become part of the existing styles,
   wherein at least one of the contributor device and the administrator device also is configured to provide user-specific information to the production server, and
   wherein the production server: applies the specified rules in relation to the user-specific information in order to select a style, applies the selected style to generate a completed show that includes the video content received from the contributor device, and makes the completed show available to at least one of the contributor device or the administrator device.

2. A system according to claim 1, wherein the selected style includes an intro, a frame design that has at least one frame in which the video content is displayed, a background behind said at least one frame, and an outro.

3. A system according to claim 1, wherein the production server automatically selects the style and creates the completed show using said selected style at least one of: (a) upon receipt of the video content or (b) upon receipt of the video content and receipt of a command to begin.

4. A system according to claim 1, wherein the selected style has been automatically selected based on a time of year.

5. A system according to claim 1, wherein the selected style has been automatically selected based on information regarding at least one of a user's: age, gender or religion.

6. A system according to claim 1, wherein the selected style has been automatically selected based on information regarding a user's location.

7. A system according to claim 1, wherein the administrator device is used to design styles and rules for all users of the system, and further comprising an entity administrator device that is configured to (a) design entity-specific styles and entity-specific rules pertaining only to contributors within a specific originating entity and (b) communicate said entity-specific styles and said entity-specific rules to the production server.

8. A system according to claim 7, wherein the entity-specific styles can be designed by selecting design elements from the library and by uploading original design elements to the production server.

9. A system according to claim 7, wherein the entity-specific styles can be designed by altering parameters of design elements within the library.

10. A system according to claim 9, wherein said parameters include location of a design element on an overall video window.

11. A system according to claim 9, wherein said parameters include duration of at least one of an intro or and outro.

12. A system according to claim 9, wherein said parameters include text to be inserted within a design element.

13. A system according to claim 1, wherein the production server also receives second video content from a second contributor device and third video content from a third contributor device and includes the video content, the second video content and the third video content within different windows in the completed show.

14. A system according to claim 13, wherein the production server receives different video content from at least 6 different contributor devices and includes the different video content within the corresponding different windows in the completed show.

15. A system according to claim 14, wherein said different windows scroll across a display in the completed show.

16. A system according to claim 13, wherein the production server receives different video content from at least 32 different contributor devices and includes the different video content within the corresponding different windows in the completed show.

17. A system according to claim 13, wherein the production server time synchronizes the video content, the second video content and the third video content in the completed show so that videos displayed within the different windows simultaneously correspond to the same recording time.

18. A system according to claim 17, wherein the video content, the second video content and the third video content represent different participants in a conversation, all communicating with each other in real time.

19. A system according to claim 13, wherein the production server selectively highlights different ones of the video content, the second video content and the third video content at different time periods by putting the highlighted video content into a more visually prominent window.

20. A system according to claim 1, wherein the production server also receives second video content from a second contributor device and includes the video content and the second video content within different windows in the completed show.

21. A system according to claim 20, wherein the production server also stores and makes available a plurality of recordings in which interviewers are asking questions, and wherein the user can record and upload responses to selected ones of the questions, in which case the completed show sequentially includes the recording of one of the questions followed by a corresponding response uploaded by the user, repeated a plurality of times for different questions.

22. A system according to claim 1, wherein the production server makes the completed show available to at least one of an individual who contributed the video content or an administrator associated with a same originating entity as said individual.

23. A system according to claim 22, wherein at least one of said individual or said administrator has control over how the completed show is produced.

24. A system according to claim 1, wherein the existing styles include intros and outros.

25. A system according to claim 24, wherein the user-specific information used to select the selected style includes at least one of: subject matter of the completed show or an occupation, a line of business, a location, gender, age, a like, a preference, a political affiliation, religion, ethnic group or demographic information of a user who causes the completed show to be created.

26. A system according to claim 1, wherein a user who causes the completed show to be created has an ability to elect to: (i) designate that the selected style will be applied automatically or (ii) designate that the user must approve the selected style before it is applied.

27. A system according to claim 1, wherein a user who causes the completed show to be created has an ability to choose an overall theme, and a different style within that overall theme will be applied to each of a plurality of shows created by the user.

\* \* \* \* \*